(12) United States Patent
Uemichi

(10) Patent No.: US 12,519,194 B2
(45) Date of Patent: Jan. 6, 2026

(54) DIGITAL PHASE SHIFTER

(71) Applicant: Fujikura Ltd., Tokyo (JP)

(72) Inventor: Yusuke Uemichi, Sakura (JP)

(73) Assignee: Fujikura Ltd., Tokyo (JP)

( * ) Notice: Subject to any disclaimer, the term of this patent is extended or adjusted under 35 U.S.C. 154(b) by 296 days.

(21) Appl. No.: 18/274,050

(22) PCT Filed: Dec. 28, 2022

(86) PCT No.: PCT/JP2022/048543
§ 371 (c)(1),
(2) Date: Jul. 25, 2023

(87) PCT Pub. No.: WO2024/018650
PCT Pub. Date: Jan. 25, 2024

(65) Prior Publication Data
US 2024/0413512 A1   Dec. 12, 2024

(30) Foreign Application Priority Data

Jul. 19, 2022   (JP) .................................. 2022-114656

(51) Int. Cl.
*H01P 1/18*   (2006.01)
*H03H 11/16*   (2006.01)
(52) U.S. Cl.
CPC ............. *H01P 1/184* (2013.01); *H03H 11/16* (2013.01)
(58) Field of Classification Search
CPC ............ H01P 1/18; H01P 1/184; H03H 11/16
See application file for complete search history.

(56) References Cited

U.S. PATENT DOCUMENTS

| | | | |
|---|---|---|---|
| 2019/0157754 A1 | 5/2019 | Valdes Garcia et al. | |
| 2019/0158068 A1 | 5/2019 | Valdes Garcia et al. | |
| 2021/0135656 A1 | 5/2021 | Birkbeck et al. | |
| 2021/0313968 A1* | 10/2021 | Heuttner | H01P 1/184 |

(Continued)

FOREIGN PATENT DOCUMENTS

| | | |
|---|---|---|
| JP | 7076658 B1 | 5/2022 |
| JP | 7076663 B1 | 5/2022 |
| JP | 7087215 B1 | 6/2022 |

OTHER PUBLICATIONS

International Search Report dated Mar. 14, 2023, issued in counterpart International Application No. PCT/JP2022/048543. (2 pages).

(Continued)

*Primary Examiner* — John W Poos
(74) *Attorney, Agent, or Firm* — WHDA, LLP

(57) ABSTRACT

A digital phase shifter includes a bend-type connection portion configured to connect a first digital phase shift circuit located at an end of a first digital phase shift circuit group and a second digital phase shift circuit located at an end of a second digital phase shift circuit group and include a third digital phase shift circuit. A capacitor is connected in parallel to at least one of a first connection line of a first connection portion, a first connection line of a second connection portion, a region in a vicinity of a connection position between two digital phase shift circuits constituting a first digital phase circuit group, and a region in a vicinity of a connection position between two adjacent digital phase shift circuits constituting a second digital phase circuit group.

13 Claims, 17 Drawing Sheets

(56) References Cited

U.S. PATENT DOCUMENTS

2024/0222830 A1* 7/2024 Uemichi .................. H01P 1/184
2024/0429897 A1* 12/2024 Uemichi .................. H01P 5/028

OTHER PUBLICATIONS

Tousi et al., "A Ka-band Digitally-Controlled Phase Shifter with sub-degree Phase Precision", 2016 IEEE Radio Frequency Integrated Circuits Symposium, (2016), pp. 356-359. Cited in Specification and ISR. (4 pages).

* cited by examiner

COMPARATIVE EXAMPLE

EMBODIMENT EXAMPLE 1

COMPARATIVE EXAMPLE

EMBODIMENT EXAMPLE 2

COMPARATIVE EXAMPLE

EMBODIMENT EXAMPLE 3

COMPARATIVE EXAMPLE

EMBODIMENT EXAMPLE 4

COMPARATIVE EXAMPLE

EMBODIMENT EXAMPLE 5

1

DIGITAL PHASE SHIFTER

TECHNICAL FIELD

The present invention relates to a digital phase shifter.
Priority is claimed on Japanese Patent Application No. 2022-114656, filed Jul. 19, 2022, the content of which is incorporated herein by reference.

BACKGROUND ART

In Patent Document 1, a digitally-controlled phase shift circuit (a digital phase shift circuit) for high-frequency signals such as microwaves, quasi-millimeter waves, or millimeter waves is disclosed. The digital phase shift circuits are actually mounted on a semiconductor substrate in a state in which a large number of digital phase shift circuits are connected in cascade. That is, the digital phase shift circuit is a unitary unit in the configuration of an actual digital phase shifter and a desired function is exhibited by connecting several tens of digital phase shift circuits in cascade.

When the configuration of the digital phase shifter is a configuration in which the above digital phase shift circuits are connected in a line, the length of the digital phase shifter increases. In order to shorten the length of the digital phase shifter, a configuration in which the configuration of the digital phase shifter is bent using a connection portion such as a bend-type line having a bent structure is conceivable.

CITATION LIST

Non-Patent Document

[Non-Patent Document 1]
A Ka-band Digitally-Controlled Phase Shifter with Sub-degree Phase Precision (2016, IEEE, RFIC)

SUMMARY OF INVENTION

Technical Problem

Meanwhile, in a digital phase shifter with a configuration in which a large number of digital phase shift circuits are connected in cascade, it is desirable to eliminate a distribution of phase shift amounts. However, a distribution of phase shift amounts is also generated due to weak reflections occurring in a front side and a rear side of a connection portion in a situation in which suitable input/output impedance matching is achieved in the above-described digital phase shifter configured to be bent using a connection portion such as a bend-type line.

The present invention is made in view of the above-described circumstances and provides a digital phase shifter capable of averaging a distribution of phase shift amounts generated due to weak reflections occurring in a front side and a rear side of a connection portion in a certain segment.

Solution to Problem

According to a first aspect of the present invention, there is provided a digital phase shifter including: at least one first digital phase shift circuit group in which a plurality of digital phase shift circuits are connected in cascade; at least one second digital phase shift circuit group in which a plurality of digital phase shift circuits are connected in cascade; and at least one bend-type connection portion configured to connect a first digital phase shift circuit located at an end of the first digital phase shift circuit group and a second digital phase shift circuit located at an end of the second digital phase shift circuit group, wherein the digital phase shift circuit includes at least a signal line, a pair of inner lines provided on both sides of the signal line, a pair of outer lines provided outside of the pair of inner lines, a first grounding conductor connected to one ends of the pair of inner lines and the pair of outer lines, a second grounding conductor connected to the other ends of the pair of outer lines, and a pair of electronic switches, one of the pair of electronic switches being provided between the other end of one of the pair of inner lines and the second grounding conductor and the other of the pair of electronic switches being provided between the other end of the other of the pair of inner lines and the second grounding conductor, wherein the digital phase shift circuit is a circuit which is set in a low-delay mode in which a return current flows through the pair of inner lines or a high-delay mode in which a return current flows through the pair of outer lines, wherein the connection portion includes a first connection portion connected to the first digital phase shift circuit; a second connection portion connected to the second digital phase shift circuit; and a third digital phase shift circuit that is the digital phase shift circuit interposed between the first connection portion and the second connection portion, wherein the first connection portion includes a first connection line for connecting the signal line of the first digital phase shift circuit and the signal line of the third digital phase shift circuit and the second connection portion includes another first connection line for connecting the signal line of the second digital phase shift circuit and the signal line of the third digital phase shift circuit, and wherein a capacitor is connected in parallel to at least one of the first connection line of the first connection portion, the first connection line of the second connection portion, a region in a vicinity of a connection position between the signal lines of two adjacent digital phase shift circuits constituting the first digital phase shift circuit group, and a region in a vicinity of a connection position between the signal lines of two adjacent digital phase shift circuits constituting the second digital phase shift circuit group.

In the digital phase shifter of the first aspect of the present invention, the capacitor is connected in parallel to at least one of the first connection line of the first connection portion, the first connection line of the second connection portion, the region in the vicinity of the connection position between the signal lines of the two adjacent digital phase shift circuits constituting the first digital phase circuit group, and the region in the vicinity of the connection position between the signal lines of the two adjacent digital phase shift circuits constituting the second digital phase circuit group. Thereby, it is possible to average a distribution of phase shift amounts generated due to weak reflections occurring in a front side and a rear side of a connection portion in a certain segment.

According to a second aspect of the present invention, in the digital phase shifter of the first aspect, the capacitor may be connected in parallel to each of the first connection line of the first connection portion on a side of the first digital phase shift circuit and the first connection line of the second connection portion on a side of the second digital phase shift circuit.

According to a third aspect of the present invention, in the digital phase shifter of the first or second aspect, the capacitor may be connected in parallel to each of the signal line of the third digital phase shift circuit on a side of the first connection portion and the signal line of the third digital phase shift circuit on a side of the second connection portion.

According to a fourth aspect of the present invention, in the digital phase shifter of any one of the first to third aspects, the capacitor may be connected in parallel to one of a region in a vicinity of a connection position between the signal line of the first digital phase shift circuit and the signal line of a fourth digital phase shift circuit adjacent to the first digital phase shift circuit and a region in vicinity of a connection position between the signal line of the second digital phase shift circuit and the signal line of a fifth digital phase shift circuit adjacent to the second digital phase shift circuit.

According to a fifth aspect of the present invention, in the digital phase shifter of the fourth aspect, the capacitor connected in parallel to the one of the region in the vicinity of the connection position between the signal line of the first digital phase shift circuit and the signal line of the fourth digital phase shift circuit and the region in the vicinity of the connection position between the signal line of the second digital phase shift circuit and the signal line of the fifth digital phase shift circuit may be connected in parallel to a transmission line provided in the one region in the vicinity of the connection position, and the transmission line may connect the signal line of the first digital phase shift circuit and the signal line of the fourth digital phase shift circuit or connect the signal line of the second digital phase shift circuit and the signal line of the fifth digital phase shift circuit.

According to a sixth aspect of the present invention, in the digital phase shifter of any one of the first to fourth aspects, the capacitor may be connected in parallel to each of a region in a vicinity of a connection position between the signal line of the first digital phase shift circuit and the signal line of the fourth digital phase shift circuit adjacent to the first digital phase shift circuit and a region in a vicinity of a connection position between the signal line of the second digital phase shift circuit and the signal line of the fifth digital phase shift circuit adjacent to the second digital phase shift circuit.

According to a seventh aspect of the present invention, in the digital phase shifter of the sixth aspect, one of the capacitor connected in parallel in the vicinity of the connection position between the signal line of the first digital phase shift circuit and the signal line of the fourth digital phase shift circuit and the capacitor connected in parallel in the vicinity of the connection position between the signal line of the second digital phase shift circuit and the signal line of the fifth digital phase shift circuit may be connected in parallel to a transmission line provided in the vicinity of the connection position to which the one capacitor is connected in parallel, and the transmission line may connect the signal line of the first digital phase shift circuit and the signal line of the fourth digital phase shift circuit or connect the signal line of the second digital phase shift circuit and the signal line of the fifth digital phase shift circuit.

According to an eighth aspect of the present invention, in the digital phase shifter of the sixth aspect, the capacitor connected in parallel in the vicinity of the connection position between the signal line of the first digital phase shift circuit and the signal line of the fourth digital phase shift circuit may be connected in parallel to a first transmission line provided in the vicinity of the connection position between the signal line of the first digital phase shift circuit and the signal line of the fourth digital phase shift circuit, the first transmission line may connect the signal line of the first digital phase shift circuit and the signal line of the fourth digital phase shift circuit, the capacitor connected in parallel in the vicinity of the connection position between the signal line of the second digital phase shift circuit and the signal line of the fifth digital phase shift circuit may be connected in parallel to a second transmission line provided in the vicinity of the connection position between the signal line of the second digital phase shift circuit and the signal line of the fifth digital phase shift circuit, and the second transmission line may connect the signal line of the second digital phase shift circuit and the signal line of the fifth digital phase shift circuit.

According to a ninth aspect of the present invention, the digital phase shifter of any one of the first to eighth aspects may include an electronic switch configured to switch between whether or not to ground a side of one end of the capacitor.

According to a tenth aspect of the present invention, in the digital phase shifter of any one of the first to ninth aspects, at least one of the plurality of digital phase shift circuits may be a mitigation circuit configured to mitigate a distribution of phase shift amounts.

According to an eleventh aspect of the present invention, in the digital phase shifter of any one of the first to tenth aspects, the digital phase shift circuit may include a second capacitor connected between the signal line and at least one of the first grounding conductor and the second grounding conductor; and a second electronic switch configured to switch between whether or not to connect the second capacitor between the signal line and the at least one of the first grounding conductor and the second grounding conductor.

According to a twelfth aspect of the present invention, in the digital phase shifter of any one of the first to eleventh aspects, the first connection portion may include a pair of second connection lines configured to connect the pair of inner lines of the first digital phase shift circuit and the pair of inner lines of the third digital phase shift circuit, the second connection portion may include a pair of second connection lines configured to connect the pair of inner lines of the second digital phase shift circuit and the pair of inner lines of the third digital phase shift circuit, and the first connection portion may include a ground layer arranged at least one of above and below the first connection line and the pair of second connection lines; and a via-hole configured to connect at least the pair of second connection lines and the ground layer.

According to a thirteenth aspect of the present invention, in the digital phase shifter of the twelfth aspect, the first connection portion may include a pair of third connection lines configured to connect the pair of outer lines of the first digital phase shift circuit and the pair of outer lines of the third digital phase shift circuit and the second connection portion may include a pair of third connection lines configured to connect the pair of outer lines of the second digital phase shift circuit and the pair of outer lines of the third digital phase shift circuit.

Advantageous Effects of Invention

According to the aspect of the present invention, it is possible to average a distribution of phase shift amounts generated due to weak reflections occurring in a front side and a rear side of a connection portion in a certain segment.

DESCRIPTION OF EMBODIMENTS

Digital phase shifters according to embodiments of the present invention are described below in detail with reference to the drawings.

First Embodiment

<Digital Phase Shifter>

Figure 1:
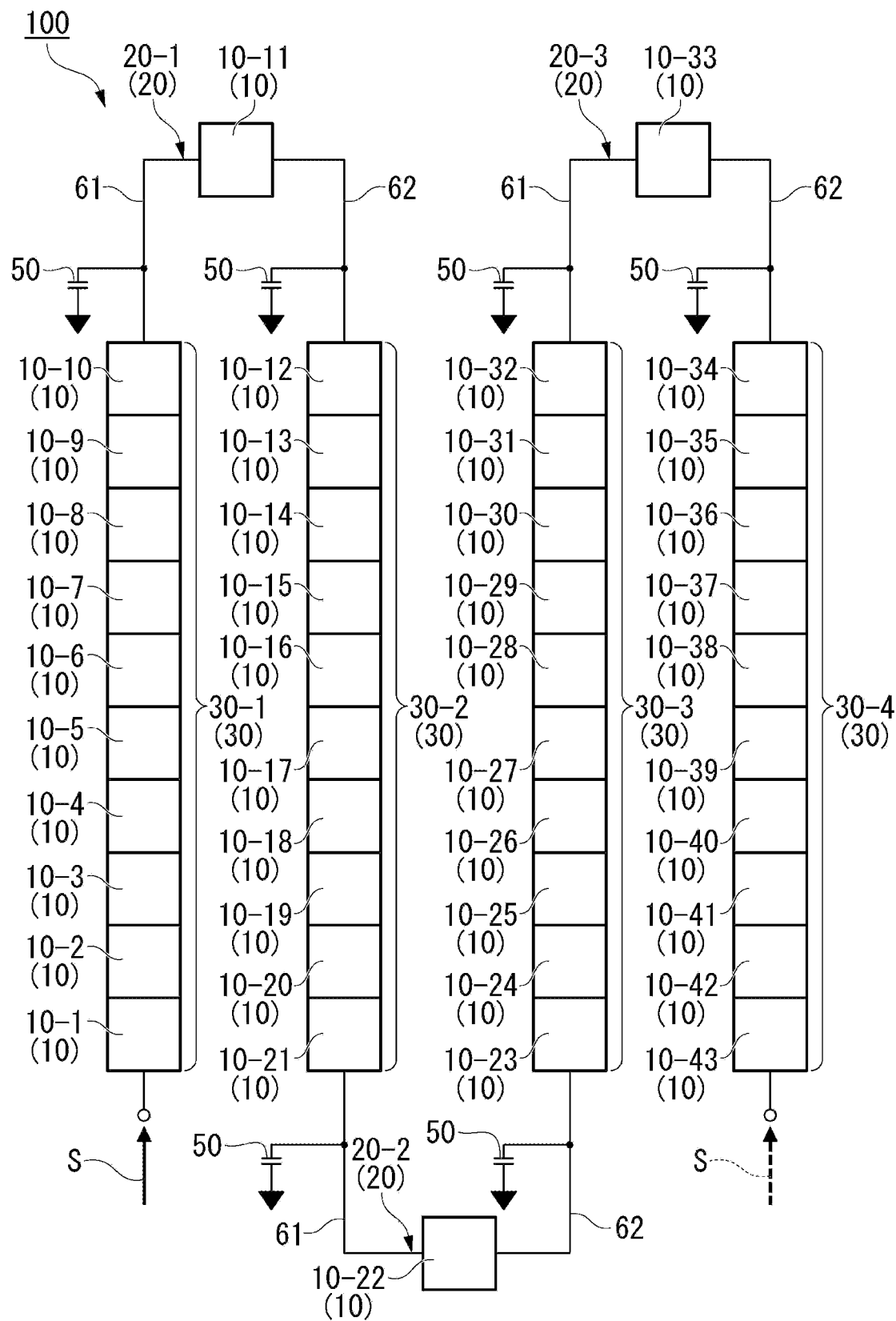
FIG. 1 is a circuit diagram showing a digital phase shifter according to a first embodiment.

FIG. 1 is a circuit diagram showing a digital phase shifter 100 according to a first embodiment. As shown in FIG. 1, a digital phase shifter 100 of the first embodiment includes a plurality of digital phase shift circuits 10 (10-1 to 10-43) and a plurality of connection portions 20 (20-1 to 20-3). In this digital phase shifter 100, the plurality of digital phase shift circuits 10 connected in cascade perform a phase shift process for a signal S having a predetermined frequency band. The signal S is a high-frequency signal having a frequency band of microwaves, quasi-millimeter waves, millimeter waves, or the like.

The plurality of digital phase shift circuits 10 are electrically connected in cascade. Although an example in which 43 digital phase shift circuits 10 (10-1 to 10-43) are connected in cascade is shown in FIG. 1, the number of digital phase shift circuits connected in cascade is arbitrary. In the example shown in FIG. 1, for convenience of description, the 43 digital phase shift circuits 10 connected in cascade are referred to as the digital phase shift circuits 10-1, 10-2, . . . , and 10-43 in the order in which the signal S indicated by a solid arrow in FIG. 1 flows. However, a direction in which the signal S flows may be reversed as indicated by a dotted arrow in FIG. 1.

Here, the digital phase shift circuits 10 constitute a digital phase shift circuit group 30 in units of a plurality of digital phase shift circuits 10. Specifically, the 1st to 10th digital phase shift circuits 10-1 to 10-10 constitute a digital phase shift circuit group 30-1 and the 12th to 21st digital phase shift circuits 10-12 to 10-21 constitute a digital phase shift circuit group 30-2. Also, the 23rd to 32nd digital phase shift circuits 10-23 to 10-32 constitute a digital phase shift circuit group 30-3 and the 34th to 43rd digital phase shift circuits 10-34 to 10-43 constitute a digital phase shift circuit group 30-4.

In other words, the digital phase shifter 100 includes the digital phase shift circuit group 30-1 in which the plurality of digital phase shift circuits 10-1 to 10-10 are connected in cascade and the digital phase shift circuit group 30-2 in which the plurality of digital phase shift circuits 10-12 to 10-21 are connected in cascade. Also, the digital phase shifter 100 includes the digital phase shift circuit group 30-3 in which the plurality of digital phase shift circuits 10-23 to 10-32 are connected in cascade and the digital phase shift circuit group 30-4 in which the plurality of digital phase shift circuits 10-34 to 10-43 are connected in cascade.

However, the three digital phase shift circuits 10-11, 10-22, and 10-33 do not constitute the digital phase shift circuit group 30. Each of these digital phase shift circuits 10-11, 10-22, and 10-33 is a relay digital phase shift circuit provided between two digital phase shift circuit groups 30. Specifically, the digital phase shift circuit 10-11 is provided between the digital phase shift circuit group 30-1 and the digital phase shift circuit group 30-2. The digital phase shift circuit 10-22 is provided between the digital phase shift circuit group 30-2 and the digital phase shift circuit group 30-3. The digital phase shift circuit 10-33 is provided between the digital phase shift circuit group 30-3 and the digital phase shift circuit group 30-4.

The connection portion 20 has a bend-type shape and connects two digital phase shift circuit groups 30. The connection portion 20 includes the above-described relay digital phase shift circuit, a first connection portion 61 for connecting the relay digital phase shift circuit and one of the two digital phase shift circuit groups 30, and a second connection portion 62 for connecting the relay digital phase shift circuit and the other of the two digital phase shift circuit groups 30. The first connection portion 61 and the second connection portion 62 each have a 90-degrees bend shape (a shape that is bent in 90 degrees).

The connection portion 20-1 connects the other end of the digital phase shift circuit group 30-1, which is an end opposite to one end of the digital phase shift circuit group 30-1 to which the signal S is input, and one end of the digital phase shift circuit group 30-2. Specifically, the first connection portion 61 in the connection portion 20-1 connects the other end of the digital phase shift circuit group 30-1, which is an end opposite to the one end of the digital phase shift circuit group 30-1 to which the signal S is input and one end of the digital phase shift circuit 10-11. Also, the second connection portion 62 in the connection portion 20-1 connects the other end of the digital phase shift circuit 10-11 and the one end of the digital phase shift circuit group 30-2. That is, the connection portion 20-1 connects the digital phase shift circuit 10-10 (the first digital phase shift circuit) in the digital phase shift circuit group 30-1 (the first digital phase shift circuit group) and the digital phase shift circuit 10-12 (the second digital phase shift circuit) in the digital phase shift circuit group 30-2 (the second digital phase shift circuit group).

The connection portion 20-2 connects the other end of the digital phase shift circuit group 30-2 and one end of the digital phase shift circuit group 30-3. Specifically, the first connection portion 61 in the connection portion 20-2 connects the other end of the digital phase shift circuit group 30-2 and one end of the digital phase shift circuit 10-22. Also, the second connection portion 62 in the connection portion 20-2 connects the other end of the digital phase shift circuit 10-22 and the one end of the digital phase shift circuit group 30-3. That is, the connection portion 20-2 connects the digital phase shift circuit 10-21 (the first digital phase shift circuit) in the digital phase shift circuit group 30-2 (the first digital phase shift circuit group) and the digital phase shift circuit 10-23 (the second digital phase shift circuit) in the digital phase shift circuit group 30-3 (the second digital phase shift circuit group).

The connection portion 20-3 connects the other end of the digital phase shift circuit group 30-3 and one end of the digital phase shift circuit group 30-4. Specifically, the first connection portion 61 in the connection portion 20-3 connects the other end of the digital phase shift circuit group 30-3 and one end of the digital phase shift circuit 10-33. Also, the second connection portion 62 in the connection portion 20-3 connects the other end of the digital phase shift circuit 10-33 and the one end of the digital phase shift circuit group 30-4. That is, the connection portion 20-3 connects the digital phase shift circuit 10-32 (the first digital phase shift circuit) in the digital phase shift circuit group 30-3 (the first digital phase shift circuit group) and the digital phase shift circuit 10-34 (the second digital phase shift circuit) in the digital phase shift circuit group 30-4 (the second digital phase shift circuit group).

The digital phase shift circuit group 30-1 and the digital phase shift circuit 10-11 are connected by the first connection portion 61 of the connection portion 20-1, and therefore the path of the signal S is bent in 90 degrees. Also, the digital phase shift circuit 10-11 and the digital phase shift circuit group 30-2 are connected by the second connection portion 62 of the connection portion 20-1, and therefore the path of the signal S is bent in 90 degrees. Also, the digital phase shift circuit group 30-2 and the digital phase shift circuit 10-22 are connected by the first connection portion 61 of the connection portion 20-2, and therefore the path of the signal S is bent in 90 degrees. Also, the digital phase shift circuit 10-22 and the digital phase shift circuit group 30-3 are connected by the second connection portion 62 of the connection portion 20-2, and therefore the path of the signal S is bent in 90 degrees. Also, the digital phase shift circuit group 30-3 and the digital phase shift circuit 10-33 are connected by the first connection portion 61 of the connection portion 20-3, and therefore the path of the signal S is bent in 90 degrees. Also, the digital phase shift circuit 10-33 and the digital phase shift circuit group 30-4 are connected by the second connection portion 62 of the connection portion 20-3, and therefore the path of the signal S is bent in 90 degrees. Thus, the digital phase shift circuit groups 30-1 to 30-4 are arrayed in parallel to each other and connected in a meander shape by the connection portions 20-1 to 20-3. In addition, details of the connection portion 20 are described below.

<Digital Phase Shift Circuit>

Figure 2:
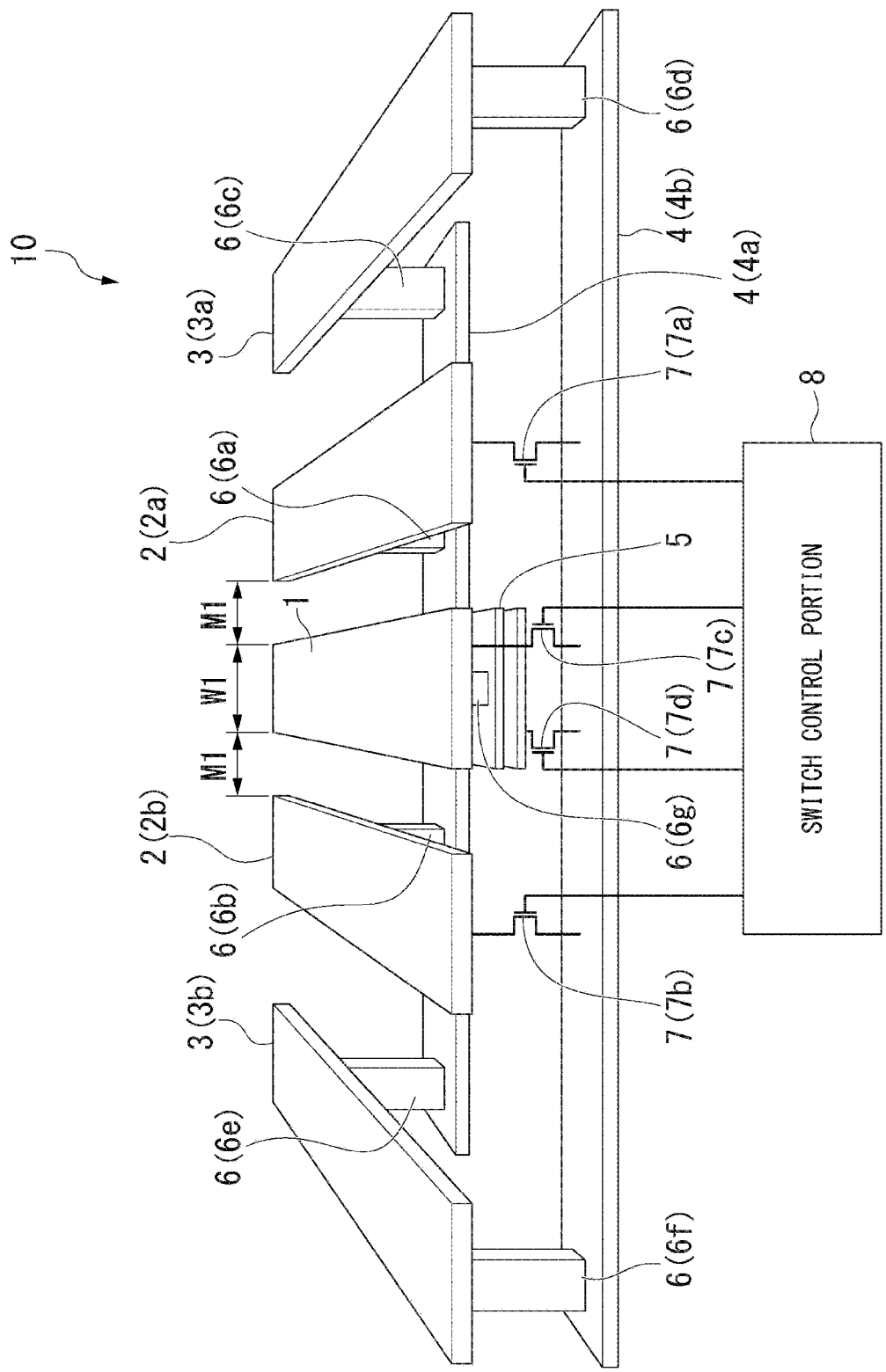
FIG. 2 is a perspective view showing a digital phase shift circuit according to the first embodiment.

FIG. 2 is a perspective view showing the digital phase shift circuit 10 according to the first embodiment. As shown in FIG. 2, the digital phase shift circuit 10 includes a signal line 1, a pair of inner lines 2 (a first inner line 2a and a second inner line 2b), a pair of outer lines 3 (a first outer line 3a and a second outer line 3b), a pair of grounding conductors 4 (a first grounding conductor 4a and a second grounding conductor 4b), a capacitor 5, a plurality of connection conductors 6, four electronic switches 7 (electronic switches 7a, 7b, 7c, and 7d), and a switch control portion 8.

The signal line 1 is a linear belt-shaped conductor extending in a predetermined direction. That is, the signal line 1 is a long plate-shaped conductor having a certain width W1, a certain thickness, and a predetermined length. In the example shown in FIG. 2, the signal S flows through the signal line 1 in a direction from the front side to the rear side.

The first inner line 2a is a linear belt-shaped conductor. That is, the first inner line 2a is a long plate-shaped conductor having a certain width, a certain thickness, and a predetermined length. The first inner line 2a extends in a direction that is the same as the extension direction of the signal line 1. The first inner line 2a is provided parallel to the signal line 1 and is separately provided at a predetermined distance M1 on one side of the signal line 1 (the right side in FIG. 1).

The second inner line 2b is a linear belt-shaped conductor. That is, the second inner line 2b is a long plate-shaped conductor having a certain width, a certain thickness, and a predetermined length like the first inner line 2a. The second inner line 2b extends in a direction that is the same as the extension direction of the signal line 1. The second inner line 2b is provided parallel to the signal line 1 and is separately provided at a predetermined distance M1 on the other side of the signal line 1 (the left side in FIG. 1).

The first outer line 3a is a linear belt-shaped conductor provided at a position farther from the signal line 1 than the first inner line 2a on the one side of the signal line 1. The first outer line 3a is a long plate-shaped conductor having a certain width, a certain thickness, and a predetermined length. The first outer line 3a is provided parallel to the signal line 1 at an interval of a predetermined distance from the signal line 1 in a state in which the first inner line 2a is sandwiched between the signal line 1 and the first outer line 3a. The first outer line 3a extends in a direction that is the same as the extension direction of the signal line 1 like the first inner line 2a and the second inner line 2b.

The second outer line 3b is a linear belt-shaped conductor provided at a position farther from the signal line 1 than the second inner line 2b on the other side of the signal line 1. The second outer line 3b is a long plate-shaped conductor having a certain width, a certain thickness, and a predetermined length like the first outer line 3a. The second outer line 3b is provided in parallel at an interval of a predetermined distance from the signal line 1 in a state in which the second inner line 2b is sandwiched between the second outer line 3b and the signal line 1. The second outer line 3b extends in a direction that is the same as the extension direction of the signal line 1 like the first inner line 2a and the second inner line 2b.

The first grounding conductor 4a is a linear belt-shaped conductor provided at a side of one ends of the first inner line 2a, the second inner line 2b, the first outer line 3a, and the second outer line 3b. The first grounding conductor 4a is electrically connected to one ends of the first inner line 2a, the second inner line 2b, the first outer line 3a, and the second outer line 3b. The first grounding conductor 4a is a long plate-shaped conductor having a certain width, a certain thickness, and a predetermined length.

The first grounding conductor 4a is provided orthogonal to the first inner line 2a, the second inner line 2b, the first outer line 3a, and the second outer line 3b extending in the same direction. The first grounding conductor 4a is provided below the first inner line 2a, the second inner line 2b, the first outer line 3a, and the second outer line 3b at an interval of a predetermined distance therefrom.

The first grounding conductor 4a is set such that one end thereof in the left-right direction has substantially the same position as the right edge of the first outer line 3a in the left-right direction. Also, the first grounding conductor 4a is set such that the other end thereof in the left-right direction has substantially the same position as the left edge of the second outer line 3b in the left-right direction.

The second grounding conductor 4b is a linear belt-shaped conductor provided at a side of the other ends of the first inner line 2a, the second inner line 2b, the first outer line 3a, and the second outer line 3b. The second grounding conductor 4b is a long plate-shaped conductor having a certain width, a certain thickness, and a predetermined length like the first grounding conductor 4a.

The second grounding conductor 4b is arranged parallel to the first grounding conductor 4a and is provided orthogonal to the first inner line 2a, the second inner line 2b, the first outer line 3a, and the second outer line 3b like the first grounding conductor 4a. The second grounding conductor 4b is provided below the first inner line 2a, the second inner line 2b, the first outer line 3a, and the second outer line 3b at an interval of a predetermined distance therefrom.

The second grounding conductor 4b is set such that one end thereof in the left-right direction has substantially the same position as the right edge of the first outer line 3a in the left-right direction. Also, the second grounding conductor 4b is set such that the other end thereof in the left-right direction has substantially the same position as the left edge of the second outer line 3b in the left-right direction. That is, the second grounding conductor 4b has the same position as the first grounding conductor 4a in the left-right direction.

The capacitor 5 is provided between the other end of the signal line 1 and the second grounding conductor 4b. For example, the capacitor 5 has an upper electrode connected to the signal line 1 and a lower electrode electrically connected to the electronic switch 7d. For example, the capacitor 5 is a thin film capacitor having a metal insulator metal (MIM) structure. In addition, the capacitor 5 has capacitance corresponding to a facing area of the parallel flat plates. Here, instead of a parallel flat plate capacitor, a comb tooth type capacitor may be used as the capacitor 5.

The plurality of connection conductors 6 include at least the connection conductors 6a to 6f. The connection conductor 6a is a conductor that electrically and mechanically connects one end of the first inner line 2a and the first grounding conductor 4a. For example, the connection conductor 6a is a conductor extending in the up-down direction and has one end (an upper end) connected to the lower surface of the first inner line 2a and the other end (a lower end) connected to the upper surface of the first grounding conductor 4a.

The connection conductor 6b is a conductor that electrically and mechanically connects one end of the second inner line 2b and the first grounding conductor 4a. For example, the connection conductor 6b is a conductor extending in the up-down direction like the connection conductor 6a and has one end (an upper end) connected to the lower surface of the second inner line 2b and the other end (a lower end) connected to the upper surface of the first grounding conductor 4a.

The connection conductor 6c is a conductor that electrically and mechanically connects one end of the first outer line 3a and the first grounding conductor 4a. For example, the connection conductor 6c is a conductor extending in the up-down direction and has one end (an upper end) connected to the lower surface at one end of the first outer line 3a and the other end (a lower end) connected to the upper surface of the first grounding conductor 4a.

The connection conductor 6d is a conductor that electrically and mechanically connects the other end of the first outer line 3a and the second grounding conductor 4b. For example, the connection conductor 6d is a conductor extending in the up-down direction and has one end (an upper end) connected to the lower surface at the other end of the first outer line 3a and the other end (a lower end) connected to the upper surface of the second grounding conductor 4b.

The connection conductor 6e is a conductor that electrically and mechanically connects one end of the second outer line 3b and the first grounding conductor 4a. For example, the connection conductor 6e is a conductor extending in the up-down direction and has one end (an upper end) connected to the lower surface at one end of the second outer line 3b, and the other end (a lower end) connected to the upper surface of the first grounding conductor 4a.

The connection conductor 6f is a conductor that electrically and mechanically connects the other end of the second outer line 3b and the second grounding conductor 4b. For example, the connection conductor 6f is a conductor extending in the up-down direction and has one end (an upper end) connected to the lower surface at the other end of the second outer line 3b and the other end (a lower end) connected to the upper surface of the second grounding conductor 4b.

The connection conductor 6g is a conductor that electrically and mechanically connects the other end of the signal line 1 and the upper electrode of the capacitor 5. For example, the connection conductor 6g is a conductor extending in the up-down direction and has one end (an upper end) connected to the lower surface at the other end of the signal line 1 and the other end (a lower end) connected to the upper electrode of the capacitor 5.

The electronic switch 7a is connected between the other end of the first inner line 2a and the second grounding conductor 4b. The electronic switch 7a is, for example, a metal-oxide-semiconductor (MOS)-type field-effect transistor (FET) and has a drain terminal electrically connected to the other end of the first inner line 2a, a source terminal electrically connected to the second grounding conductor 4b, and a gate terminal electrically connected to the switch control portion 8.

The electronic switch 7a is controlled to be in a closed state or an open state on the basis of a gate signal input from the switch control portion 8 to the gate terminal. The closed state is a state in which the drain terminal and the source terminal are electrically connected. The open state is a state in which the drain terminal and the source terminal are not electrically connected and the electrical connection is disconnected. The electronic switch 7a makes the other end of the first inner line 2a and the second grounding conductor 4b in an electrically connected state in which the other end of the first inner line 2a is electrically connected to the second grounding conductor 4b or an electrically disconnected state in which the electrical connection is disconnected under the control of the switch control portion 8.

The electronic switch 7b is connected between the other end of the second inner line 2b and the second grounding conductor 4b. The electronic switch 7b is, for example, a MOS-type FET and has a drain terminal connected to the other end of the second inner line 2b, a source terminal connected to the second grounding conductor 4b, and a gate terminal connected to the switch control portion 8.

The electronic switch 7b is controlled to be in a closed state or an open state on the basis of a gate signal input from the switch control portion 8 to the gate terminal. The electronic switch 7b makes the other end of the second inner line 2b and the second grounding conductor 4b in an electrically connected state in which the other end of the second inner line 2b is electrically connected to the second grounding conductor 4b or an electrically disconnected state in which the electrical connection is disconnected under the control of the switch control portion 8.

The electronic switch 7c is connected between the other end of the signal line 1 and the second grounding conductor 4b. The electronic switch 7c is, for example, a MOS-type FET, and has a drain terminal connected to the other end of the signal line 1, a source terminal connected to the second grounding conductor 4b, and a gate terminal connected to the switch control portion 8. Although the electronic switch 7c is provided at the other end side of the signal line 1 in the example shown in FIG. 2, the present invention is not limited thereto. The electronic switch 7c may be provided at one end side of the signal line 1. In addition, the electronic switch 7c may not be used if it is not necessary.

The electronic switch 7c is controlled to be in a closed state or an open state on the basis of a gate signal input from the switch control portion 8 to the gate terminal. The electronic switch 7c makes the other end of the signal line 1 and the second grounding conductor 4b in an electrically connected state in which the other end of the signal line 1 is electrically connected to the second grounding conductor 4b or an electrically disconnected state in which the electrical connection is disconnected under the control of the switch control portion 8.

The electronic switch 7d is connected in series with the capacitor 5 between the other end of the signal line 1 and the second grounding conductor 4b. The electronic switch 7d is, for example, a MOS-type FET. In the example shown in FIG. 2, the electronic switch 7d has a drain terminal connected to the lower electrode of the capacitor 5, a source terminal connected to the second grounding conductor 4b, and a gate terminal connected to the switch control portion 8.

The electronic switch 7d is controlled to be in a closed state or an open state on the basis of a gate signal input from the switch control portion 8 to the gate terminal. The electronic switch 7d makes the lower electrode of the capacitor 5 and the second grounding conductor 4b in an electrically connected state in which the lower electrode of the capacitor 5 is electrically connected to the second grounding conductor 4b or an electrically disconnected state in which the electrical connection is disconnected under the control of the switch control portion 8.

The switch control portion 8 is a control circuit that controls the electronic switches 7a, 7b, 7c, and 7d. For example, the switch control portion 8 includes four output ports. The switch control portion 8 individually controls the plurality of electronic switches 7 to be in an open state or a closed state by outputting separate gate signals from the output ports and supplying the gate signals to the gate terminals of the electronic switches 7.

Although a schematic diagram in which the digital phase shift circuit 10 is viewed in perspective such that the mechanical structure of the digital phase shift circuit is easily understood is shown in FIG. 2, the actual digital phase shift circuit 10 is formed as a multilayer structure using semiconductor manufacturing technology.

As an example, in the digital phase shift circuit 10, the signal line 1, the first inner line 2a, the second inner line 2b, the first outer line 3a, and the second outer line 3b are formed in a first conductive layer. The first grounding conductor 4a and the second grounding conductor 4b are formed in a second conductive layer opposite to the first conductive layer in a state in which an insulating layer is sandwiched. A component formed in the first conductive layer and a component formed in the second conductive layer are connected to each other through via-holes. The plurality of connection conductors 6 correspond to the via-holes buried inside of the insulating layer.

Next, an operation of the digital phase shift circuit 10 in the present embodiment is described. The digital phase shift circuit 10 has a high-delay mode and a low-delay mode as operating modes. The digital phase shift circuit 10 operates in the high-delay mode or the low-delay mode.

«High-Delay Mode»

Figure 3:
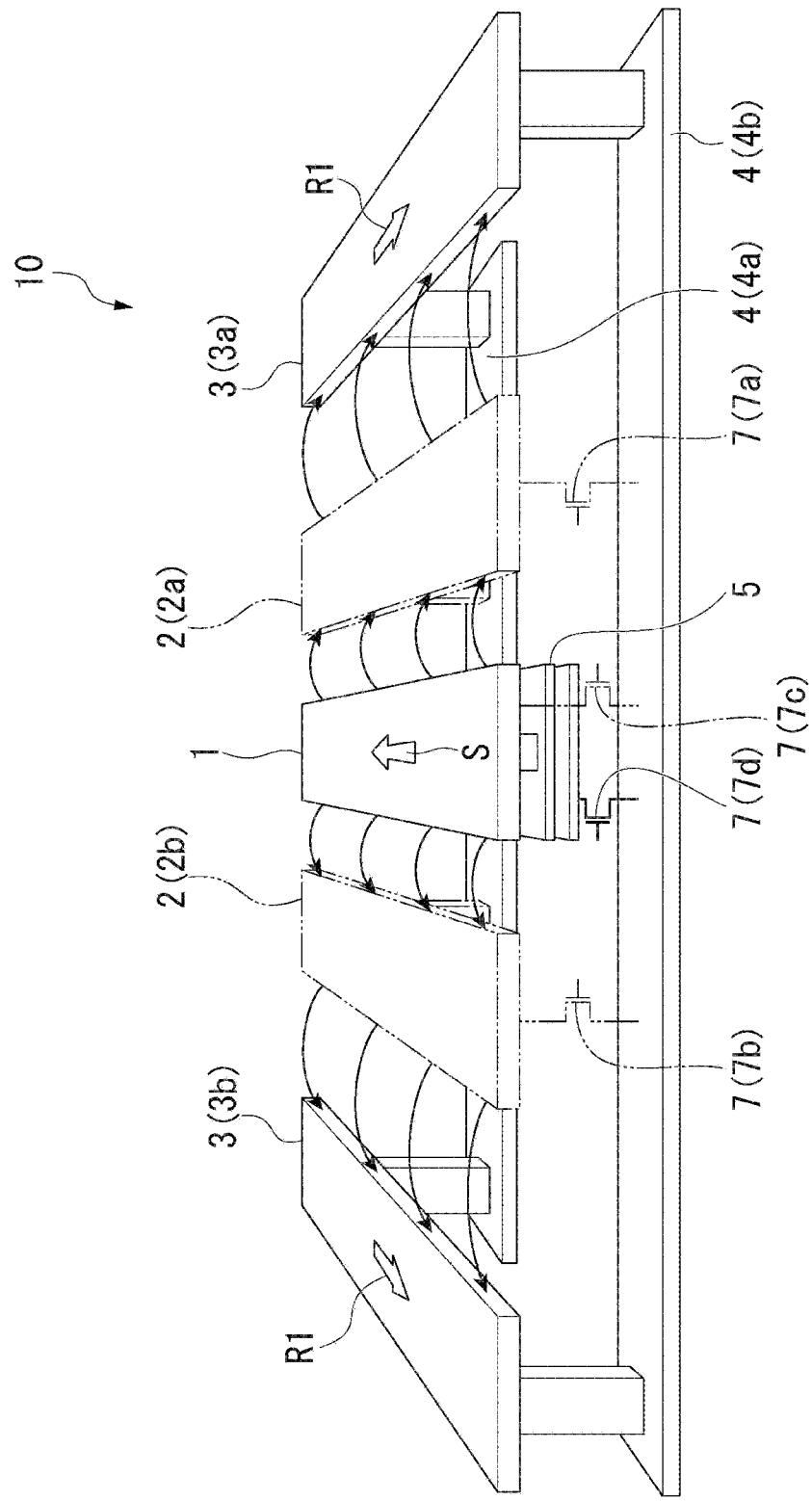
FIG. 3 is a diagram for describing a high-delay mode of the digital phase shift circuit according to the first embodiment.

FIG. 3 is a diagram for describing the high-delay mode of the digital phase shift circuit 10 according to the first embodiment. The high-delay mode is a mode in which a first phase difference is generated in the signal S. In the high-delay mode, as shown in FIG. 3, the electronic switch 7a and the electronic switch 7b are controlled to be in the open state and the electronic switch 7d is controlled to be in the closed state.

The electronic switch 7a is controlled to be in the open state and therefore the electrical connection between the other end of the first inner line 2a and the second grounding conductor 4b is disconnected. The electronic switch 7b is controlled to be in the open state and therefore the electrical connection between the other end of the second inner line 2b and the second grounding conductor 4b is disconnected. The electronic switch 7d is controlled to be in the closed state and therefore the other end of the signal line 1 is connected to the second grounding conductor 4b via the capacitor 5.

When the signal S propagates through the signal line 1 in a direction from the input end (the other end) to the output end (one end), the return current R1 flows from the one end to the other end in a direction opposite to that of the signal S (a direction in which the signal S propagates). In the high-delay mode, because the electronic switch 7a and the electronic switch 7b are in the open state, the return current R1 mainly flows through the first outer line 3a and the second outer line 3b as shown in FIG. 3.

Because the return current R1 flows through the first outer line 3a and the second outer line 3b in the high-delay mode, the inductance value L is larger than that in the low-delay mode. In the high-delay mode, it is possible to obtain a delay amount larger than that in the low-delay mode. Also, because the other end of the signal line 1 and the second grounding conductor 4b are electrically connected by the capacitor 5 when the electronic switch 7d is in the closed state, the capacitance value C of the digital phase shift circuit 10 is also large. Consequently, in the high-delay mode, it is possible to obtain a delay amount larger than that in the low-delay mode.

«Low-Delay Mode»

Figure 4:
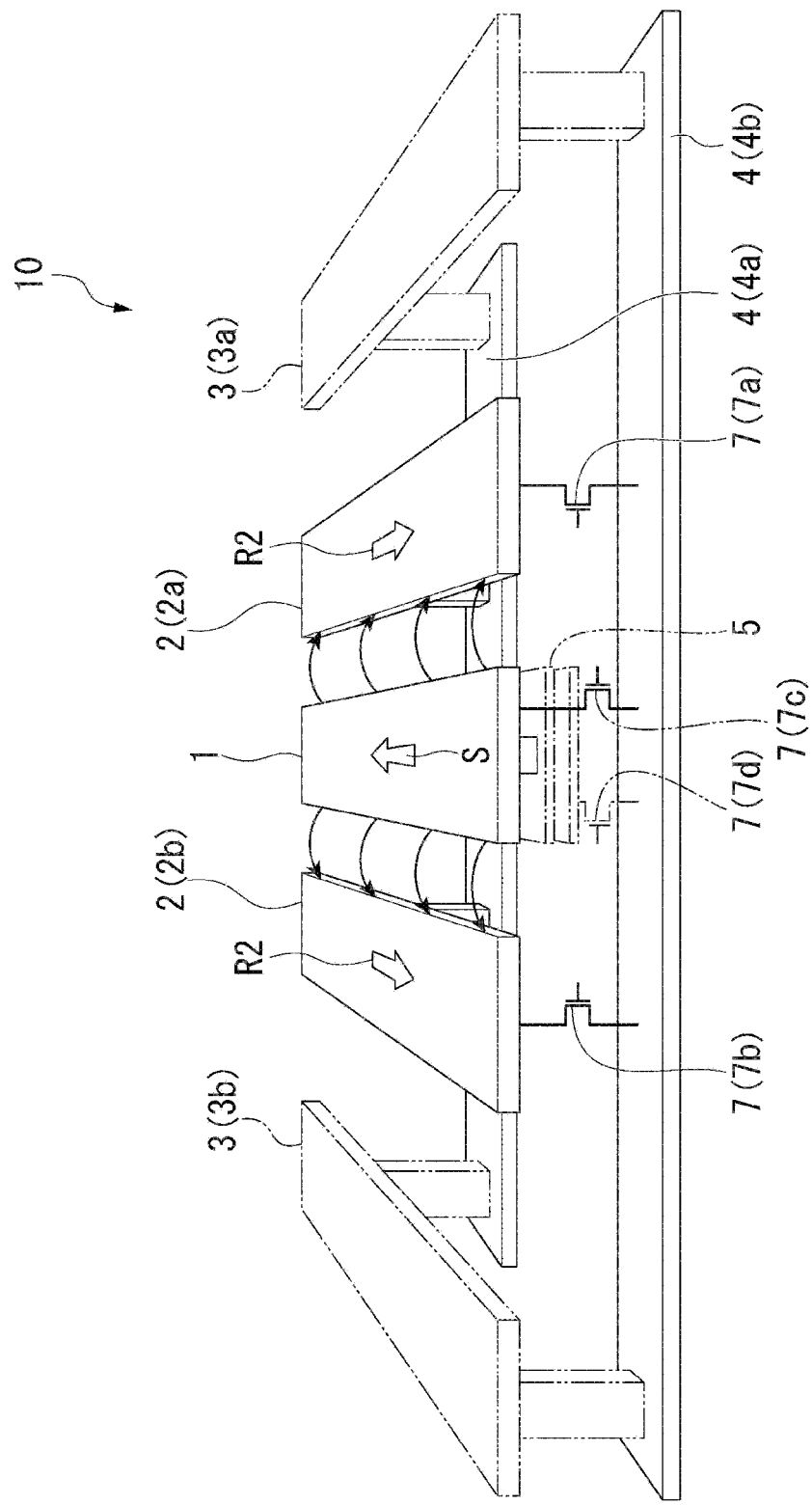
FIG. 4 is a diagram for describing a low-delay mode of the digital phase shift circuit according to the first embodiment.

FIG. 4 is a diagram for describing the low-delay mode of the digital phase shift circuit 10 according to the first embodiment. The low-delay mode is a mode in which a second phase difference smaller than a first phase difference is generated in the signal S. In the low-delay mode, as shown in FIG. 4, the electronic switch 7a and the electronic switch 7b are controlled to be in a closed state and the electronic switch 7d is controlled to be in an open state.

When the electronic switch 7a is controlled to be in the closed state, the other end of the first inner line 2a and the second grounding conductor 4b are electrically connected. When the electronic switch 7b is controlled to be in the closed state, the other end of the second inner line 2b and the second grounding conductor 4b are electrically connected.

When the signal S propagates through the signal line 1 in a direction from the input end (the other end) to the output end (one end), the return current R2 flows from the one end to the other end in a direction opposite that of the signal S. In the low-delay mode, because the electronic switch 7a and the electronic switch 7b are in the closed state, the return current R2 mainly flows through the first inner line 2a and the second inner line 2b as shown in FIG. 4.

Because the return current R2 flows through the first inner line 2a and the second inner line 2b in the low-delay mode, the inductance value L is smaller than that in the high-delay mode. The delay amount in the low-delay mode is smaller than the delay amount in the high-delay mode. Although the capacitor 5 is connected to the other end of the signal line 1, because the electronic switch 7d is in the open state, the capacitance of capacitor 5 is non-functional and there is only parasitic capacitance that is significantly less than the capacitance of the capacitor 5. Consequently, in the low-delay mode, it is possible to obtain a delay amount smaller than that in the high-delay mode.

Here, in the low-delay mode, the loss of the signal line 1 can be intentionally increased by controlling the electronic switch 7c to be in a closed state. This is to make the loss of the high-frequency signal in the low-delay mode substantially equal to the loss of the high-frequency signal in the high-delay mode.

That is, the loss of the high-frequency signal in the low-delay mode is clearly less than the loss of the high-frequency signal in the high-delay mode. This loss difference causes an amplitude difference of the high-frequency signal output from the digital phase shift circuit 10 when the operation mode is switched between the low-delay mode and the high-delay mode. In relation to this circumstance, the digital phase shift circuit 10 can eliminate the above-described amplitude difference by controlling the electronic switch 7c to be in the closed state in the low-delay mode.

<Connection Portion>

Figure 5:
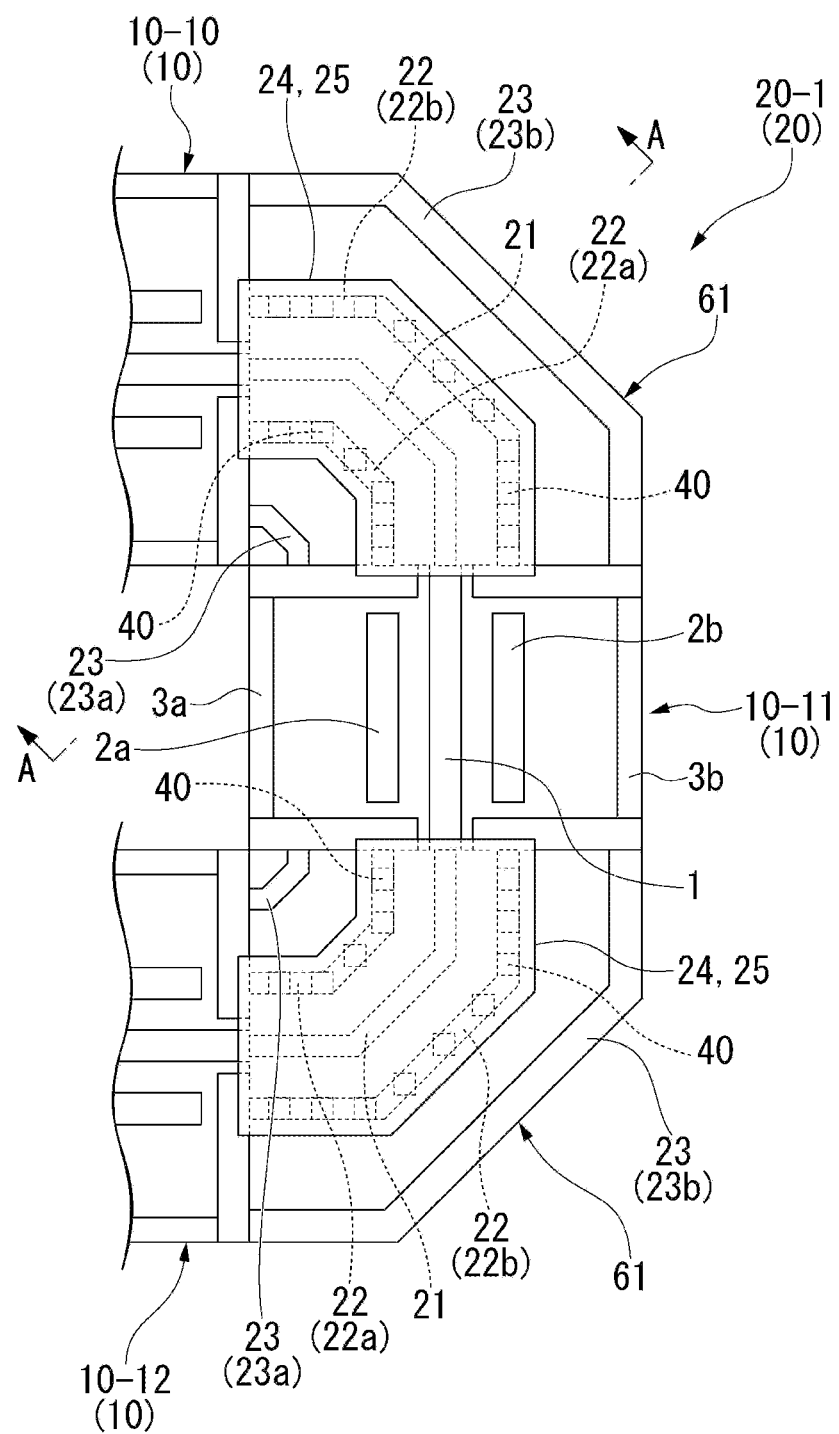
FIG. 5 is a plan view showing a connection portion according to the first embodiment.
Figure 6:
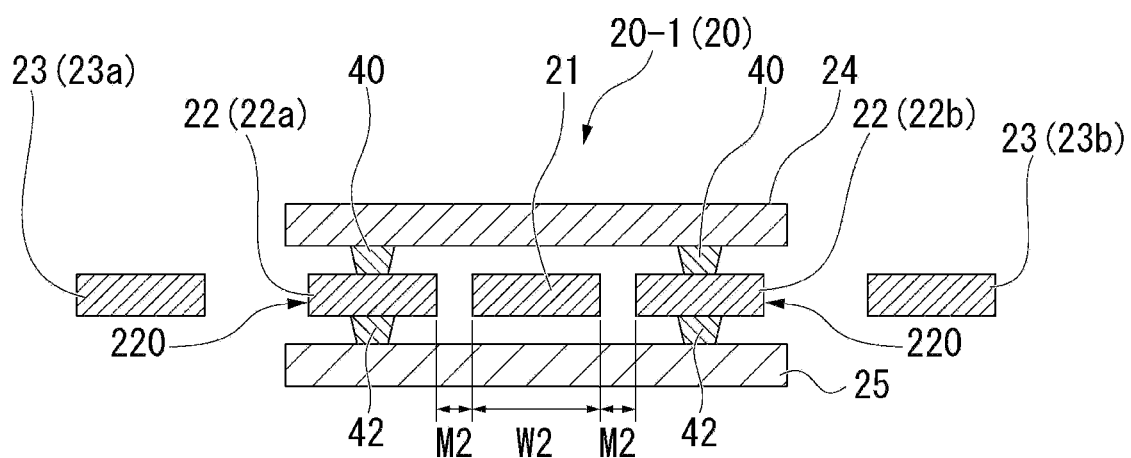
FIG. 6 is a cross-sectional view taken along line A-A in FIG. 5.

FIG. 5 is a plan view showing the connection portion 20 according to the first embodiment. FIG. 6 is a cross-sectional view taken along line A-A in FIG. 5. In addition, the digital phase shifter 100 of the present embodiment includes three connection portions 20 (connection portions 20-1, 20-2, and 20-3), but the connection portion 20-1 is described here because the three connection portions 20 have similar configurations. As shown in FIGS. 5 and 6, the connection portion 20-1 includes a first connection portion 61, a second connection portion 62, and a digital phase shift circuit 10-11 (a relay digital phase shift circuit) interposed between the first connection portion 61 and the second connection portion 62.

The connection portion 20-1 includes the first connection portion 61 and the second connection portion 62, but the first connection portion 61 is described here because the first connection portion 61 and the second connection portion 62 have similar configurations. The first connection portion 61 includes a first connection line 21, a second connection line 22, a third connection line 23, a first ground layer 24, and a second ground layer 25.

The first connection line 21 is, for example, a long plate-shaped conductor having a certain width W2, a certain thickness, and a predetermined length. The first connection line 21 connects the signal line 1 of the digital phase shift circuit 10-10 and the signal line 1 of the digital phase shift circuit 10-11. The signal S output from the signal line 1 of the digital phase shift circuit 10-10 is input to the signal line 1 of the digital phase shift circuit 10-11 via the first connection line 21. In addition, the width W2 of the first connection line 21 may be similar to the width W1 of the signal line 1 or may be wider than the width W1.

The second connection line 22 is a long plate-shaped conductor having a certain width, a certain thickness, and a predetermined length. The second connection line 22 extends in a direction that is the same as the extension direction of the signal line 1. The second connection line 22 is provided parallel to the first connection line 21 and is separately provided at a predetermined distance M2 therefrom. Specifically, the second connection lines 22 are arranged on both sides of the first connection line 21 at an interval of the predetermined distance M2 from the first connection line 21. In addition, in the following description, the second connection line 22 arranged on one side of the first connection line 21 may be referred to as a "second connection line 22a" and the second connection line 22 arranged on the other side of the first connection line 21 may be referred to as a "second connection line 22b."

The predetermined distance M2 may be equivalent to the predetermined distance M1 or may be shorter than the predetermined distance M1. For example, when the predetermined distance M1 is 10 μm, the predetermined distance M2 may be set to less than 10 μm. More preferably, the predetermined distance M2 is, for example, 2.5 μm or 2 μm or less, and it is desirable to make the second connection line 22 as close as possible to the first connection line 21. In the present embodiment, the second connection line 22 may be made close to the manufacturing limit or near the manufacturing limit with respect to the first connection line 21.

The second connection line 22 connects the inner line 2 of the digital phase shift circuit 10-10 and the inner line 2 of the digital phase shift circuit 10-11. The second connection line 22a has one end connected to the first inner line 2a of the digital phase shift circuit 10-10 and the other end connected to the first inner line 2a of the digital phase shift circuit 10-11. The second connection line 22b has one end connected to the second inner line 2b of the digital phase shift circuit 10-10 and the other end connected to the second inner line 2b of the digital phase shift circuit 10-11.

The third connection lines 23 are belt-shaped conductors provided farther from the first connection line 21 than the second connection line 22 on both sides that are one side and the other side of the first connection line 21. The third connection line 23 is provided parallel to the first connection line 21 at an interval of a predetermined distance in a state in which the second connection line 22 is sandwiched between the first connection line 21 and the third connection line 23. In addition, in the following description, the third connection line 23 arranged on the one side of the first connection line 21 may be referred to as a "third connection line 23a" and the third connection line 23 arranged on the other side of the first connection line 21 may be referred to as a "third connection line 23b."

The third connection line 23 connects the outer line 3 of the digital phase shift circuit 10-10 and the outer line 3 of the digital phase shift circuit 10-11. The third connection line 23a has one end connected to the first outer line 3a of the digital phase shift circuit 10-10 and the other end connected to the first outer line 3a of the digital phase shift circuit 10-11. The third connection line 23b has one end connected to the second outer line 3b of the digital phase shift circuit 10-10 and the other end connected to the second outer line 3b of the digital phase shift circuit 10-11.

The first ground layer 24 is provided above the first connection line 21 and the second connection line 22 at an interval of a predetermined distance therefrom. With regard to the first ground layer 24, the width of the first ground layer 24 is preferably set such that the first ground layer 24 extends to at least one side surface 220 of each second connection line 22. The side surface 220 is a side surface opposite to the side where the first connection line 21 is arranged out of side surfaces of the second connection line 22.

The first ground layer 24 is connected to the second connection line 22a and the second connection line 22b via via-holes 40. As shown in FIG. 5, a plurality of via-holes 40 are arrayed along the second connection line 22a and a plurality of via-holes 40 are arrayed along the second connection line 22b.

The second ground layer 25 is provided below the first connection line 21 and the second connection line 22 at an interval of a predetermined distance therefrom. With regard to the second ground layer 25, the width of the second ground layer 25 is preferably set such that the second ground layer 25 extends to at least one side surface 220 of each second connection line 22.

The second ground layer 25 is connected to the second connection line 22a and the second connection line 22b via via-holes 42. Like the via-holes 40, a plurality of via-holes 42 are arrayed along the second connection line 22a and a plurality of via-holes 42 are arrayed along the second connection line 22b.

Figure 7:
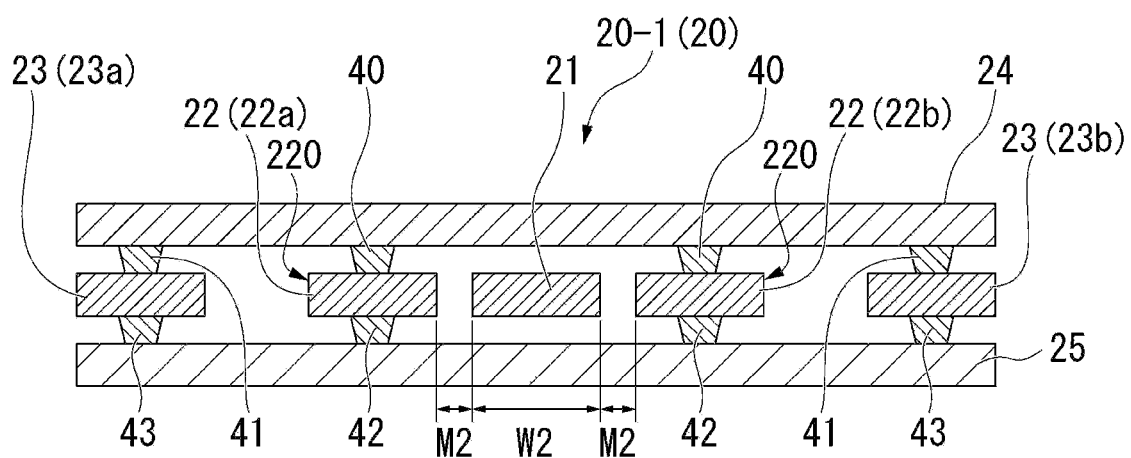
FIG. 7 is a cross-sectional view showing a modified example of the connection portion according to the first embodiment.

FIG. 7 is a cross-sectional view showing a modified example of the first connection portion 61 according to the first embodiment. As shown in FIG. 7, the first connection portion 61 may have the first ground layer 24 extending above the third connection line 23 and the second ground layer 25 extending below the third connection line 23.

In this modified example, the first ground layer 24 is connected to the second connection line 22a and the second connection line 22b via the via-holes 40 and is connected to the third connection line 23a and the third connection line 23b via via-holes 41. In addition, in the configuration illustrated in FIG. 7, a plurality of via-holes 41 are arrayed along the third connection line 23a and a plurality of via-holes 41 are arrayed along the third connection line 23b.

Also, the second ground layer 25 is connected to the second connection line 22a and the second connection line 22b via the via-holes 42 and is connected to the third connection line 23a and the third connection line 23b via via-holes 43. In addition, in the configuration illustrated in FIG. 7, like the via-holes 41, a plurality of via-holes 43 are arrayed along the third connection line 23a and a plurality of via-holes 43 are arrayed along the third connection line 23b.

Although the first connection portion 61 has a first ground layer 24 and a second ground layer 25 in the example shown in FIGS. 6 and 7, the present invention is not limited thereto. At least one of the first ground layer 24 and the second ground layer 25 may be provided. That is, it is only necessary to arrange a ground layer at least one of above and below the first connection line 21.

Returning to FIG. 1, the capacitor 50 is connected in parallel to the connection portion 20 having the above-described configuration. The capacitor 50 is a reactance element for averaging a distribution of phase shift amounts generated due to weak reflections occurring in a front side and a rear side of the connection portion 20. The capacitor 50 is connected in parallel to each of the three connection portions 20 (the connection portions 20-1, 20-2, and 20-3). Specifically, the capacitor 50 is connected in parallel to each of the first connection portion 61 and the second connection portion 62 in the three connection portions 20 (the connection portions 20-1, 20-2, and 30-3).

The capacitor 50 is, for example, a thin film capacitor having a metal insulator metal (MIM) structure. The capacitor 50 has capacitance corresponding to a facing area of the parallel flat plates. However, a comb-tooth type capacitor may be used as the capacitor 5 instead of a parallel flat plate capacitor. In the capacitor 50, the upper electrode is connected to the first connection line 21 and the lower electrode is electrically grounded. In addition, the lower electrode of the capacitor 50 may be connected to one of the first ground layer 24, the second ground layer 25, the grounding conductor 4 of the nearest digital phase shift circuit 10, and any other ground (such as the frame ground of the digital phase shifter 100 (not shown)).

In the connection portion 20-1, the capacitor 50 is connected in parallel to one end on the digital phase shift circuit 10-10 side of the first connection portion 61. One end of the first connection portion 61 is preferably a connection position (contact point) between the first connection line 21 of the first connection portion 61 and the signal line 1 of the digital phase shift circuit 10-10, but may be in the vicinity of the connection position. For example, the one end of the first connection portion 61 may be a region on the digital phase shift circuit 10-10 side when the total length of the first connection portion 61 is divided into three equal parts in three regions or may be preferably a region closest to the digital phase shift circuit 10-10 side when the total length of the first connection portion 61 is divided into five equal parts in five regions. When the upper electrode of the capacitor 50 is arranged at the center of the first connection line 21 (the signal line 1) in the width direction, the lower electrode of the capacitor 50 is also arranged at the center of the first connection line 21 in the width direction. In this case, the ground for connecting the lower electrode of the capacitor 50 is preferably any one of the first grounding conductor 4a of the digital phase shift circuit 10-10, the first ground layer 24, and the second ground layer 25 in the vicinity of the connection position of the upper electrode. Also, the ground for connecting the lower electrode of the capacitor 50 may be away from the center of the first connection line 21, and may be, for example, the outer line 3 of the digital phase shift circuit 10-10.

Also, in the connection portion 20-1, the capacitor 50 is connected in parallel to the other end on the digital phase shift circuit 10-12 side of the second connection portion 62. The other end of the second connection portion 62 is preferably a connection position (contact point) between the first connection line 21 of the second connection portion 62 and the signal line 1 of the digital phase shift circuit 10-12, but may be in the vicinity of the connection position. For example, the other end of the second connection portion 62 may be a region on the digital phase shift circuit 10-12 side when the total length of the second connection portion 62 is divided into three equal parts in three regions or may be preferably a region closest to the digital phase shift circuit 10-12 side when the total length of the second connection portion 62 is divided into five equal parts in five regions. When the upper electrode of the capacitor 50 is arranged at the center of the first connection line 21 (the signal line 1) in the width direction, the lower electrode of the capacitor 50 is also arranged at the center of the first connection line 21 in the width direction. In this case, the ground for connecting the lower electrode of the capacitor 50 is preferably any one of the second grounding conductor 4b of the digital phase shift circuit 10-12, the first ground layer 24, and the second ground layer 25 in the vicinity of the connection position of the upper electrode. Also, the ground for connecting the lower electrode of the capacitor 50 may be away from the center of the first connection line 21 and, for example, may be the outer line 3 of the digital phase shift circuit 10-12.

Likewise, in the connection portion 20-2, the capacitor 50 is connected in parallel to one end on the digital phase shift circuit 10-21 side of the first connection portion 61. Also, in the connection portion 20-2, the capacitor 50 is connected in parallel to the other end on the digital phase shift circuit 10-23 side of the second connection portion 62. Also, likewise, in the connection portion 20-3, the capacitor 50 is connected in parallel to one end on the digital phase shift circuit 10-32 side of the first connection portion 61. Also, in the connection portion 20-3, the capacitor 50 is connected in parallel to the other end on the digital phase shift circuit 10-34 side of the second connection portion 62.

<Characteristics of Digital Phase Shifters>

Figure 8A:
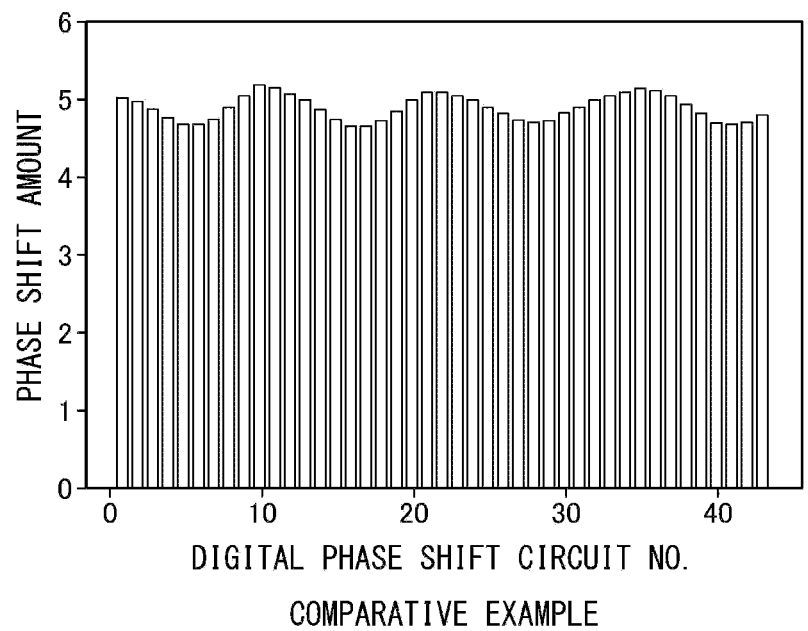
FIG. 8A is a diagram showing a distribution of phase shift amounts of a comparative example in which the capacitor is removed from the digital phase shifter according to the first embodiment.
Figure 8B:
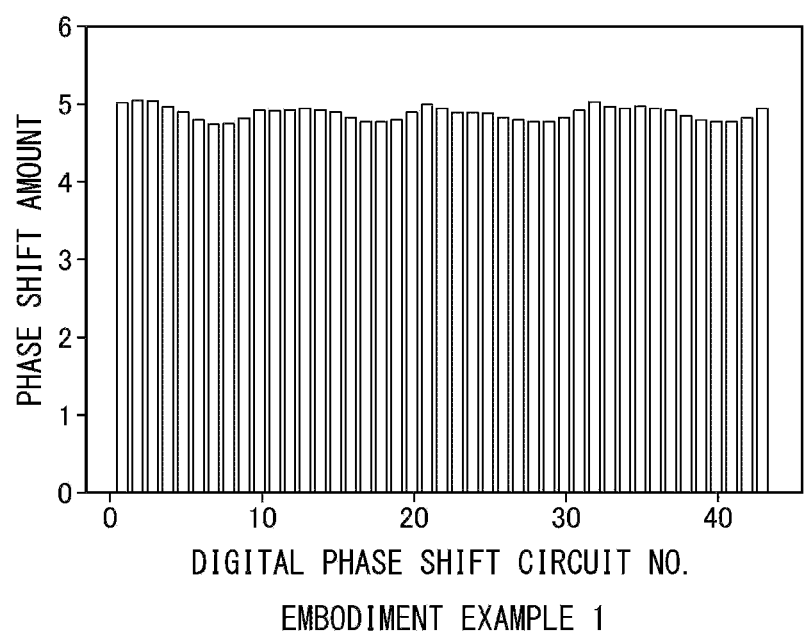
FIG. 8B is a diagram showing a distribution of phase shift amounts of Embodiment Example 1 in the digital phase shifter according to the first embodiment.

FIG. 8A is a diagram showing a distribution of phase shift amounts of the comparative example in which the capacitor 50 is removed from the digital phase shifter 100 according to the first embodiment. FIG. 8B is a diagram showing a distribution of phase shift amounts of Embodiment Example 1 in the digital phase shifter 100 according to the first embodiment. In the graphs shown in FIGS. 8A and 8B, the horizontal axis represents a number ("1" to "43") of the digital phase shift circuit 10 and the vertical axis represents a phase shift amount for each digital phase shift circuit 10.

The phase shift amount distributions shown in FIGS. 8A and 8B are obtained when switching control for the low-delay mode is sequentially performed in the order of the digital phase shift circuits 10-43 to 10-1 from the digital phase shift circuit 10-43 from a state in which all the digital phase shift circuits 10-1 to 10-43 are set in the high-delay mode. This is because the capacitor 5 in the digital phase shift circuit 10-$n$ ($n$ is an integer satisfying "n is greater than or equal to one and less than or equal to 42") is provided on (connected to) (the grounding conductor 4 of) a side to which the digital phase shift circuit 10-(n+1) is connected. Also, the phase shift amount distributions shown in FIGS. 8A and 8B are phase shift amount distributions of a case where the frequency of the signal S is 30 [GHz] and the capacitance of the capacitor 50 is 20 [fF]. An ideal characteristic of the digital phase shifter 100 is that the top of a graph shown in FIG. 8 is flat (that there is no phase shift amount distribution (there is no non-uniformity of phase shift amounts)).

First, referring to FIG. 8A, in the digital phase shift circuits 10 (the digital phase shift circuits 10-10 to 10-12, 10-21 to 10-23, 10-32 to 10-34, and the like) in the vicinity of the connection portion 20, it can be seen that a projection portion (a portion where the phase shift amount is increased) occurs in a distribution of phase shift amounts.

Next, referring to FIG. 8B, in the digital phase shift circuits 10 (the digital phase shift circuits 10-10 to 10-12, 10-21 to 10-23, 10-32 to 10-34, and the like) in the vicinity of the connection portion 20, the projection portion of the distribution of phase shift amounts is small and the distribution of phase shift amounts is averaged (flat (or nearly flat)) as compared with FIG. 8A. Thus, it can be seen that it is desirable to connect the capacitor 50 in parallel to each of the first connection portion 61 and the second connection portion 62 of the connection portion 20.

The first connection portion 61 and the second connection portion 62 of the connection portion 20 include a transmission line and characteristic impedance is dominated by a real part. On the other hand, an imaginary part in the impedance of the digital phase shift circuit group 30 in which a plurality of digital phase shift circuits 10 are connected in cascade cannot be ignored, with weak reflections in the connection portion 20 being caused by differences therebetween, and it is estimated that the weak reflections lead to a distribution of phase shift amounts. Under this estimation, in the first embodiment, an element of an imaginary part (the capacitor 50 that is a reactance element) is introduced to a portion (the first connection portion 61 and the second connection portion 62) assumed to be the cause. Thereby, in the first embodiment, the distribution of phase shift amounts is averaged.

As described above, the digital phase shifter 100 of the present embodiment includes a first digital phase shift circuit group (for example, the digital phase shift circuit group 30-1) in which a plurality of digital phase shift circuits 10 are connected in cascade; a second digital phase shift circuit group (for example, the digital phase shift circuit group 30-2) in which a plurality of digital phase shift circuits 10 are connected in cascade; and a bend-type connection portion (for example, the connection portion 20-1) configured to connect a first digital phase shift circuit (for example, the digital phase shift circuit 10-10) located at an end of the first digital phase shift circuit group and a second digital phase shift circuit (for example, the digital phase shift circuit 10-12) located at an end of the second digital phase shift circuit group.

In addition, the first digital phase shift circuit group may be any one of the digital phase shift circuit groups 30-1 to 30-4. It is only necessary for the second digital phase shift circuit group to be a digital phase shift circuit group different from the first digital phase shift circuit group. That is, the digital phase shift circuit groups 30-1 to 30-4 may correspond to the first digital phase shift circuit group or may correspond to the second digital phase shift circuit group in relation to other digital phase shift circuit groups. Also, the connection portion 20 to which the capacitor 50 is connected in parallel may be at least one of the connection portions 20-1 to 20-3 as long as the first digital phase shift circuit group and the second digital phase shift circuit group are connected.

Also, as shown in FIG. 2, the digital phase shift circuit 10 includes at least the signal line 1, the pair of inner lines 2 provided on both sides of the signal line 1, the pair of outer lines 3 provided outside of the pair of inner lines 2, the first grounding conductor 4a connected to one ends of the pair of inner lines 2 and the pair of outer lines 3, the second grounding conductor 4b connected to the other ends of the pair of outer lines 3, and the pair of electronic switches 7a and 7b, the electronic switch 7a being provided between the other end of one of the pair of inner lines 2 and the second grounding conductor 4b and the electronic switch 7b being provided between the other end of the other of the pair of inner lines 2 and the second grounding conductor 4b. The digital phase shift circuit 10 is a circuit which is set in a low-delay mode in which a return current flows through the pair of inner lines 2 or a high-delay mode in which a return current flows through the pair of outer lines 3.

In the digital phase shifter 100, the capacitor 50 is connected in parallel to each of the first connection line 21 of the first connection portion 61 and the first connection line 21 of the second connection portion 62. Thereby, as shown in FIG. 8B, a distribution of phase shift amounts generated due to weak reflections occurring in a front side and a rear side of the connection portion 20 can be averaged. Also, the capacitor 50 is connected in parallel to each of the first digital phase shift circuit (for example, the digital phase shift circuit 10-10) side of the first connection portion 61 and the second digital phase shift circuit (for example, the digital phase shift circuit 10-12) side in the second connection portion 62, and therefore weak reflections occurring in a front side and a rear side of the connection portion 20 can be effectively reduced.

Second Embodiment

Figure 9:
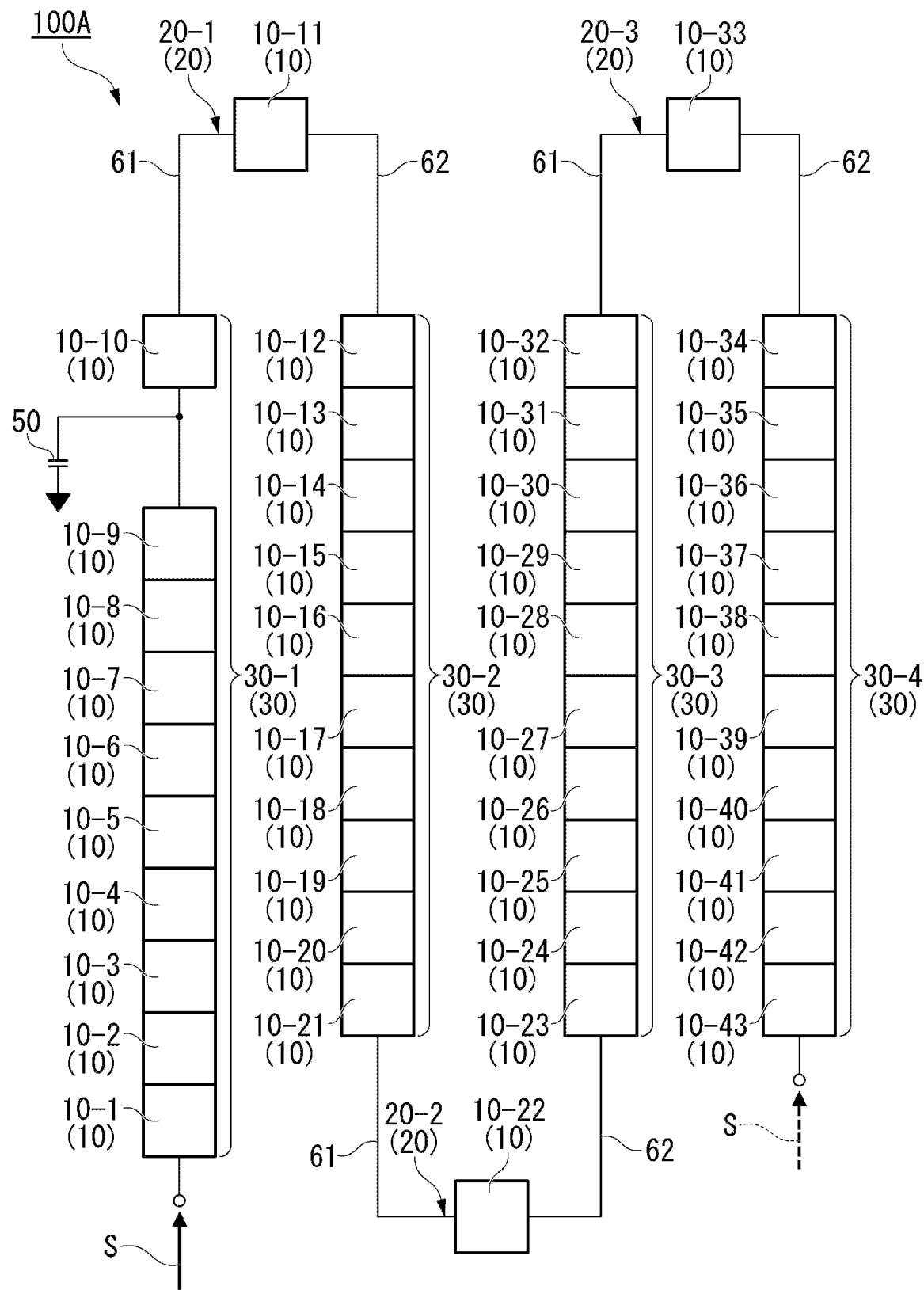
FIG. 9 is a circuit diagram showing a digital phase shifter according to a second embodiment.

Next, a second embodiment of the present invention is described. In the following description, components identical or equivalent to those of the above-described embodiment are denoted by the same reference signs, and the description thereof is simplified or omitted.
<Digital Phase Shifter>
FIG. 9 is a circuit diagram showing a digital phase shifter 100A according to the second embodiment. As shown in FIG. 9, the digital phase shifter 100A in the second embodiment is different from that in the above-described embodiment in that a capacitor 50 is connected in parallel only between a digital phase shift circuit 10-10 connected to a connection portion 20-1 and a digital phase shift circuit 10-9 adjacent to the digital phase shift circuit 10-10 which are digital phase shift circuits 10 included in a digital phase shift circuit group 30-1.

A position between the digital phase shift circuit 10-10 and the digital phase shift circuit 10-9 is preferably a connection position (contact point) between a signal line 1 of the digital phase shift circuit 10-10 and a signal line 1 of the digital phase shift circuit 10-9, but may be in the vicinity of the connection position. For example, "between the digital phase shift circuit 10-10 and the digital phase shift circuit 10-9" may be the signal line 1 of the digital phase shift circuit 10-10 side slightly deviated from the connection position to the digital phase shift circuit 10-10 side or the signal line 1 of the digital phase shift circuit 10-9 side slightly deviated from the connection position to the digital phase shift circuit 10-9 side. Also, as long as the signal line 1 of the digital phase shift circuit 10-10 and the signal line 1 of the digital phase shift circuit 10-9 are connected by a transmission line (not shown), "between the digital phase shift circuit 10-10 and the digital phase shift circuit 10-9" may be the transmission line.

The capacitor 50 may be connected in parallel only between the digital phase shift circuit 10-12 connected to the connection portion 20-1 and the digital phase shift circuit 10-13 adjacent to the digital phase shift circuit 10-12.

The capacitor 50 may be connected in parallel only between the digital phase shift circuit 10-21 connected to the connection portion 20-2 and the digital phase shift circuit 10-20 adjacent to the digital phase shift circuit 10-21.

The capacitor 50 may be connected in parallel only between the digital phase shift circuit 10-23 connected to the connection portion 20-2 and the digital phase shift circuit 10-24 adjacent to the digital phase shift circuit 10-23.

The capacitor 50 may be connected in parallel only between the digital phase shift circuit 10-32 connected to the connection portion 20-3 and the digital phase shift circuit 10-31 adjacent to the digital phase shift circuit 10-32.

The capacitor 50 may be connected in parallel only between the digital phase shift circuit 10-34 connected to the connection portion 20-3 and the digital phase shift circuit 10-35 adjacent to the digital phase shift circuit 10-34.

The capacitor 50 may be connected in parallel to two or more of a region between the digital phase shift circuit 10-10 and the digital phase shift circuit 10-9, a region between the digital phase shift circuit 10-12 and the digital phase shift circuit 10-13, a region between the digital phase shift circuit 10-21 and the digital phase shift circuit 10-20, a region between the digital phase shift circuit 10-23 and the digital phase shift circuit 10-24, a region between the digital phase shift circuit 10-32 and the digital phase shift circuit 10-31, and a region between the digital phase shift circuit 10-34 and digital phase shift circuit 10-35.

Figure 10A:
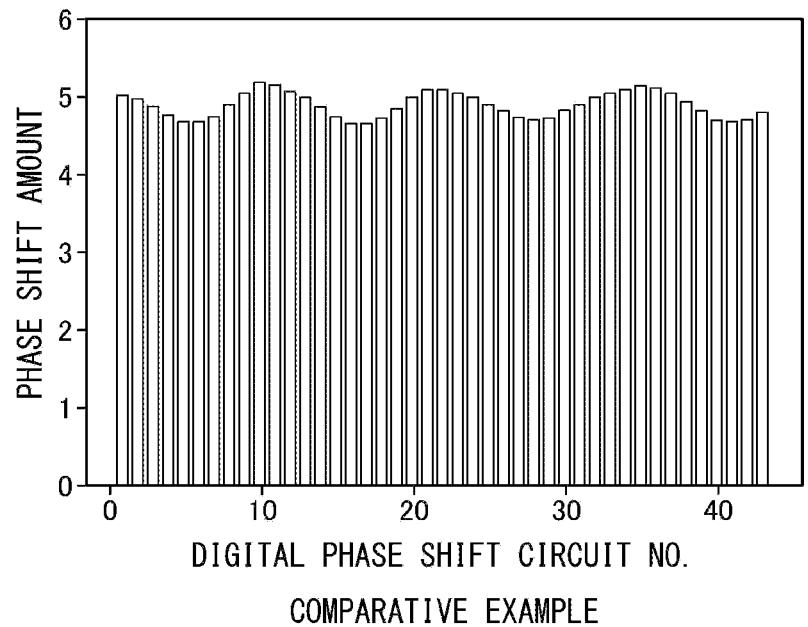
FIG. 10A is a diagram showing a distribution of phase shift amounts of a comparative example in which a capacitor is removed from the digital phase shifter according to the second embodiment.
Figure 10B:
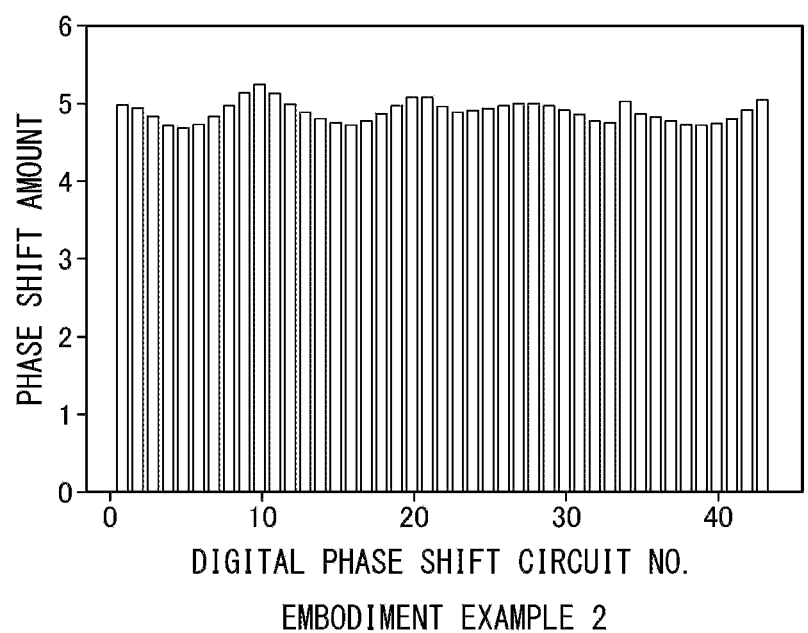
FIG. 10B is a diagram showing a distribution of phase shift amounts of Embodiment Example 2 in the digital phase shifter according to the second embodiment.

In this case, the capacitor 50 may be connected in parallel in the vicinity of the connection position between the signal lines 1 of the two digital phase shift circuits 10. Also, in this case, when the signal lines 1 of the two digital phase shift circuits 10 are connected by a transmission line (not shown), the capacitor 50 may be connected in parallel to the transmission line.
<Characteristics of Digital Phase Shifter>
FIG. 10A is a diagram showing a distribution of phase shift amounts of a comparative example in which the capacitor 50 is removed from the digital phase shifter 100A according to the second embodiment. FIG. 10B is a diagram showing a distribution of phase shift amounts of Embodiment Example 2 in the digital phase shifter 100A according to the second embodiment. Other conditions are similar to those of FIGS. 8A and 8B.

First, referring to FIG. 10A, in the digital phase shift circuits 10 (the digital phase shift circuits 10-10 to 10-12, 10-21 to 10-23, 10-32 to 10-34, and the like) in the vicinity of the connection portion 20, it can be seen that a projection portion occurs in a distribution of phase shift amounts.

Next, referring to FIG. 10B, in the digital phase shift circuits 10 (the digital phase shift circuits 10-21 to 10-23, 10-32 to 10-34, and the like) in the vicinity of the connection portion 20, the projection portion of the distribution of phase shift amounts is small and the distribution of phase shift amounts is averaged (flat (or nearly flat)) as compared with FIG. 10A. For this reason, it can be seen that it is desirable to connect the capacitor 50 in parallel between the cells of the first and second digital phase shift circuits 10 adjacent to the connection portion 20.

Figure 11A:
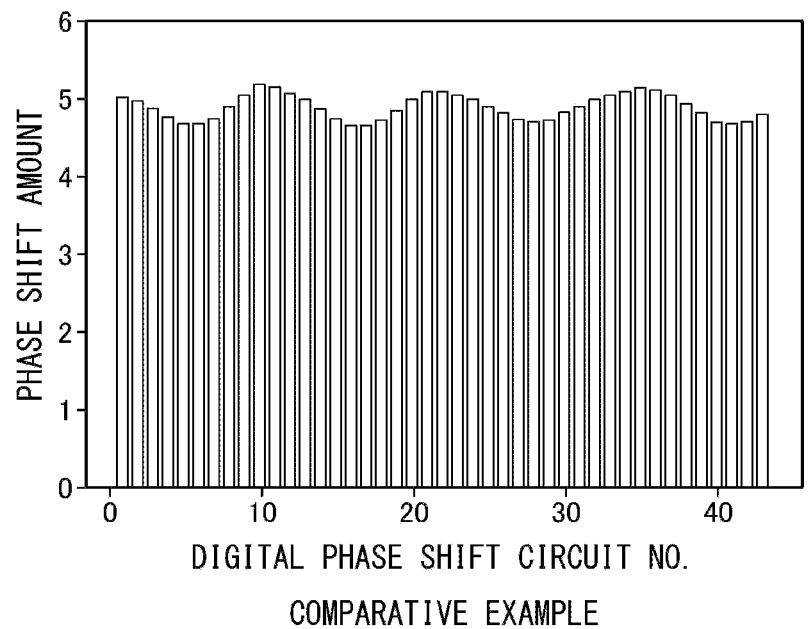
FIG. 11A is a diagram showing a distribution of phase shift amounts of a comparative example in which a capacitor is removed in a modified example of the digital phase shifter according to the second embodiment.
Figure 11B:
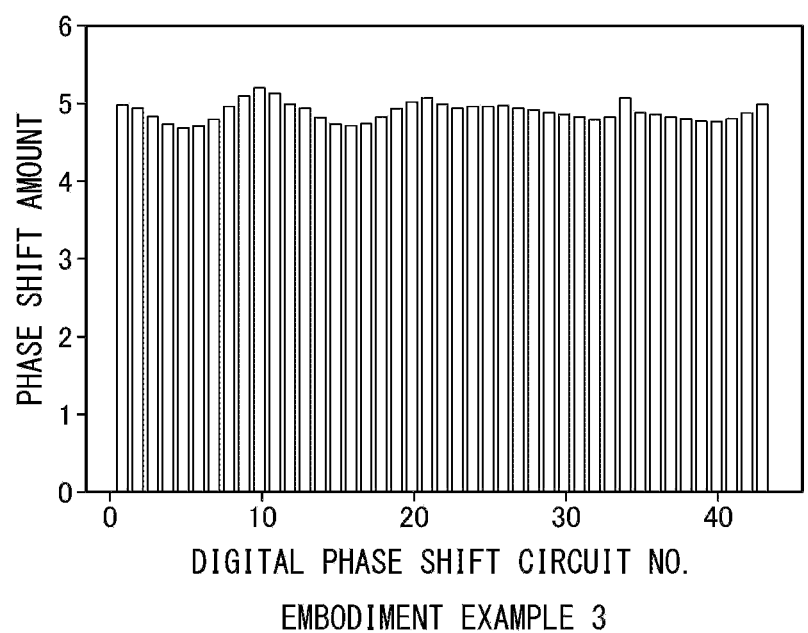
FIG. 11B is a diagram showing a distribution of phase shift amounts of Embodiment Example 3 in a modified example of the digital phase shifter according to the second embodiment.

FIG. 11A is a diagram showing a distribution of phase shift amounts of a comparative example in which the capacitor 50 is removed in a modified example of the digital phase shifter 100A according to the second embodiment. FIG. 11B is a diagram showing a distribution of phase shift amounts of Embodiment Example 3 in a modified example of the digital phase shifter 100A according to the second embodiment. In the modified example of the digital phase shifter 100A, the signal line 1 of the digital phase shift circuit 10-10 and the signal line 1 of the digital phase shift circuit 10-9 are connected by a transmission line (not shown), and the capacitor 50 is connected in parallel to the transmission line. Other conditions are similar to those of FIGS. 8A and 8B.

First, referring to FIG. 11A, in the digital phase shift circuits 10 (the digital phase shift circuits 10-10 to 10-12, 10-21 to 10-23, 10-32 to 10-34, and the like) in the vicinity of the connection portion 20, it can be seen that a projection portion occurs in a distribution of phase shift amounts.

Next, referring to FIG. 11B, in the digital phase shift circuits 10 (the digital phase shift circuits 10-21 to 10-23, 10-32 to 10-34, and the like) in the vicinity of the connection portion 20, the projection portion of the distribution of phase shift amounts is small and the distribution of phase shift amounts is averaged (flat (or nearly flat)) as compared with FIG. 11A. For this reason, it can be seen that it is desirable to connect the capacitor 50 in parallel between the cells of the first and second digital phase shift circuits 10 adjacent to the connection portion 20.

As described above, in the digital phase shifter 100A of the second embodiment, the capacitor 50 is connected in parallel between the first digital phase shift circuit (for example, the digital phase shift circuit 10-10) connected to the connection portion 20 (for example, the connection portion 20-1) and the fourth digital phase shift circuit (for example, the digital phase shift circuit 10-9) adjacent to the first digital phase shift circuit which are the digital phase shift circuits 10 included in the first digital phase shift circuit group (for example, the digital phase shift circuit group 30-1). On the other hand, the capacitor 50 is not connected in parallel between the second digital phase shift circuit (for example, the digital phase shift circuit 10-12) connected to the connection portion 20 (for example, the connection portion 20-1) and the fifth digital phase shift circuit (for example, the digital phase shift circuit 10-13) adjacent to the second digital phase shift circuit which are the digital phase shift circuits 10 included in the second digital phase shift circuit group (for example, the digital phase shift circuit group 30-2). Thus, the distribution of the phase shift amount can be averaged by introducing an element of an imaginary part (the capacitor 50 that is a reactance element) to a portion (one of a portion between the digital phase shift circuit 10-10 and the digital phase shift circuit 10-9 and a portion between the digital phase shift circuit 10-12 and the digital phase shift circuit 10-13) assumed to cause of generation of weak reflections in the connection portion 20.

Third Embodiment

Next, a third embodiment of the present invention is described. In the following description, components identical or equivalent to those of the above-described embodiment are denoted by the same reference signs, and the description thereof is simplified or omitted.

<Digital Phase Shifter>

Figure 12:
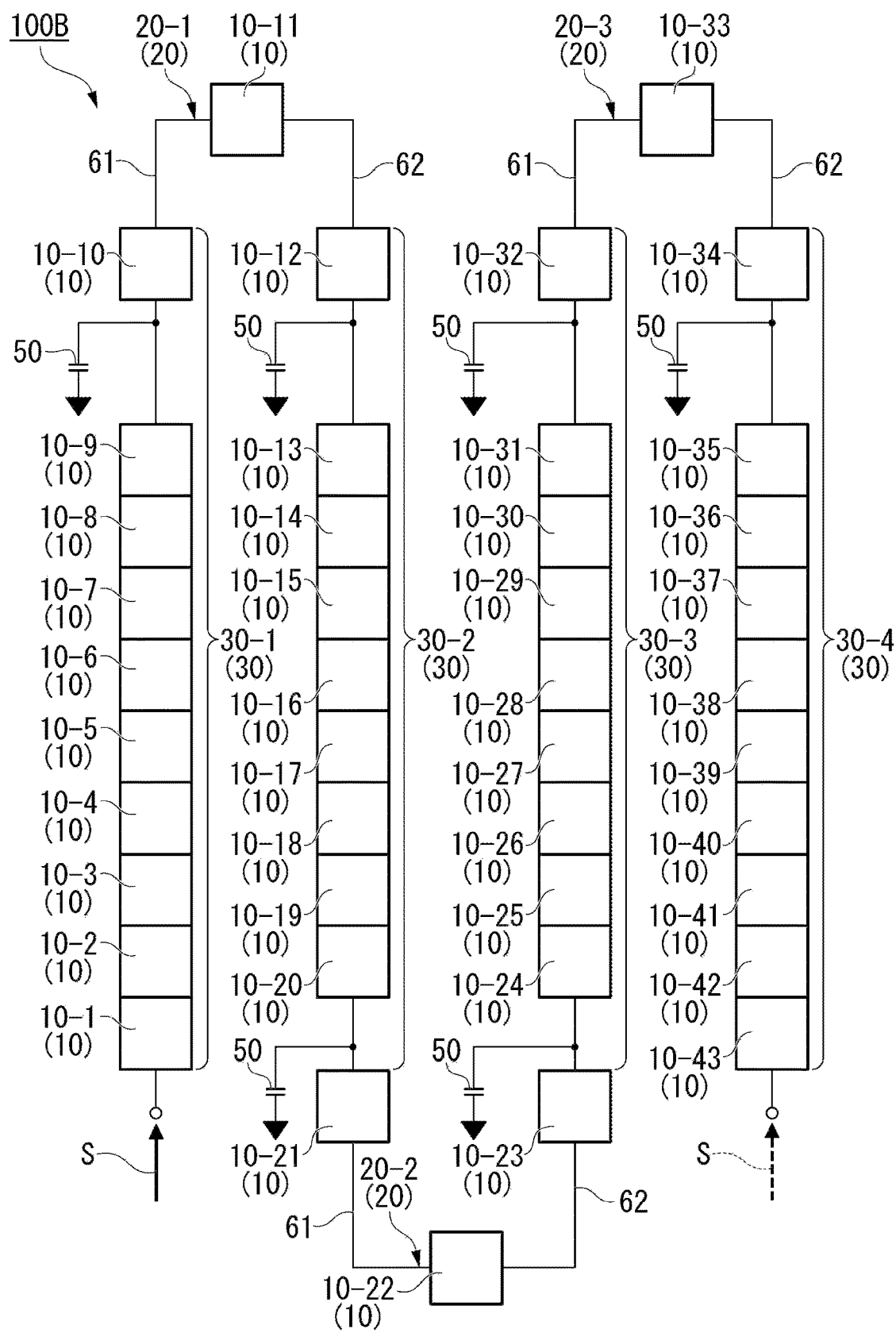
FIG. 12 is a circuit diagram showing a digital phase shifter according to a third embodiment.

FIG. 12 is a circuit diagram showing a digital phase shifter 100B according to the third embodiment. The digital phase shifter 100B in the third embodiment as shown in FIG. 12 is different from that in the above-described embodiment in that the capacitor 50 is connected in parallel between a first digital phase shift circuit 10 connected to a connection portion 20 and a second digital phase shift circuit 10 adjacent to the digital phase shift circuit 10 viewed from the connection portion 20.

Specifically, in the digital phase shift circuit group 30-1, the capacitor 50 is connected in parallel between the digital phase shift circuit 10-10 connected to the connection portion 20-1 and the digital phase shift circuit 10-9 adjacent to the digital phase shift circuit 10-10. Although a position between the digital phase shift circuit 10-10 and the digital phase shift circuit 10-9 is preferably a connection position (contact point) between the signal line 1 of the digital phase shift circuit 10-10 and the signal line 1 of the digital phase shift circuit 10-9 as in the above-described second embodiment, the position may be in the vicinity of the connection position.

Likewise, in the digital phase shift circuit group 30-2, the capacitor 50 is connected in parallel between the digital phase shift circuit 10-12 connected to the connection portion 20-1 and the digital phase shift circuit 10-13 adjacent to the digital phase shift circuit 10-12. Further, in the digital phase shift circuit group 30-2, the capacitor 50 is connected in parallel between the digital phase shift circuit 10-21 connected to the connection portion 20-2 and the digital phase shift circuit 10-20 adjacent to the digital phase shift circuit 10-21.

Likewise, in the digital phase shift circuit group 30-3, the capacitor 50 is connected in parallel between the digital phase shift circuit 10-23 connected to the connection portion 20-2 and the digital phase shift circuit 10-24 adjacent to the digital phase shift circuit 10-23. Further, in the digital phase shift circuit group 30-3, the capacitor 50 is connected in parallel between the digital phase shift circuit 10-32 connected to the connection portion 20-3 and the digital phase shift circuit 10-31 adjacent to the digital phase shift circuit 10-32.

Likewise, in the digital phase shift circuit group 30-4, the capacitor 50 is connected in parallel between the digital phase shift circuit 10-34 connected to the connection portion 20-3 and the digital phase shift circuit 10-35 adjacent to the digital phase shift circuit 10-34.

The capacitor 50 may be connected in the vicinity of the connection position between the signal lines 1 of the two digital phase shift circuits 10. Also, in this case, when the signal lines 1 of the two digital phase shift circuits 10 are connected by a transmission line (not shown), the capacitor 50 may be connected in parallel to the transmission line.

<Characteristics of Digital Phase Shifter>

Figure 13A:
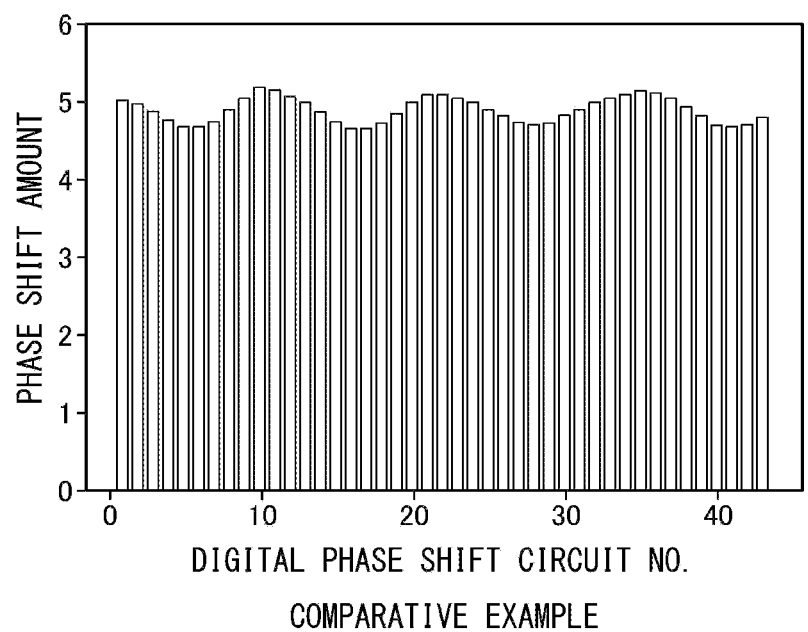
FIG. 13A is a diagram showing a distribution of phase shift amounts of a comparative example in which a capacitor is removed from the digital phase shifter according to the third embodiment.
Figure 13B:
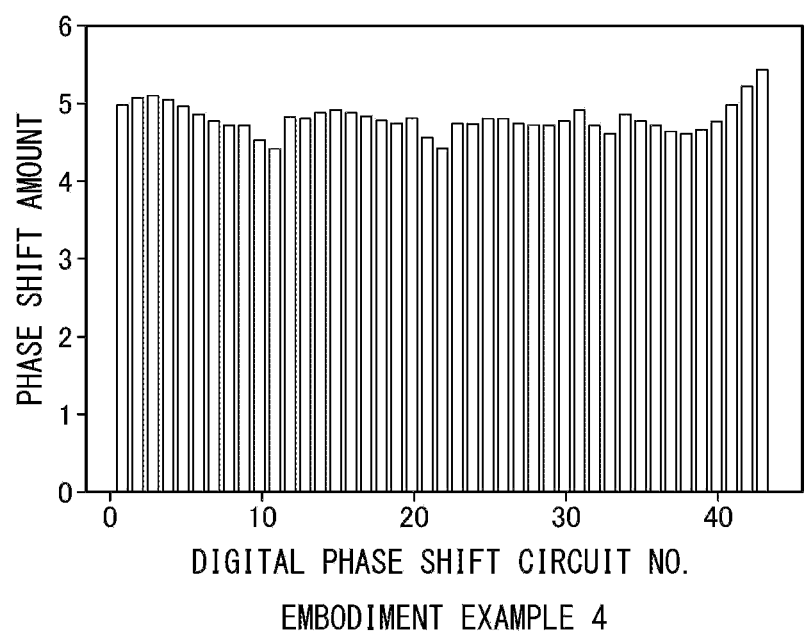
FIG. 13B is a diagram showing a distribution of phase shift amounts of Embodiment Example 4 in the digital phase shifter according to the third embodiment.

FIG. 13A is a diagram showing a distribution of phase shift amounts of the comparative example in which the capacitor 50 is removed from the digital phase shifter 100B according to the third embodiment. FIG. 13B is a diagram showing a distribution of phase shift amounts of Embodiment Example 4 in the digital phase shifter 100B according to the third embodiment. Other conditions are the similar to those of FIGS. 8A and 8B.

First, referring to FIG. 13A, in the digital phase shift circuits 10 (the digital phase shift circuits 10-10 to 10-12, 10-21 to 10-23, 10-32 to 10-34, and the like) in the vicinity of the connection portion 20, it can be seen that a projection portion occurs in a distribution of phase shift amounts.

Next, referring to FIG. 13B, in the digital phase shift circuits 10 (the digital phase shift circuits 10-10 to 10-12, 10-21 to 10-23, 10-32 to 10-34, and the like) in the vicinity of the connection portion 20, the projection portion of the distribution of phase shift amounts is small and the distribution of phase shift amounts is averaged (a recess and projection difference is small) as compared with FIG. 13A. For this reason, it can be seen that it is desirable to connect the capacitor 50 in parallel between the cells of the first and second digital phase shift circuits 10 adjacent to the connection portion 20. Although the projection portion of the distribution of the phase shift amount is locally large in the digital phase shift circuit 10-43 or the like in the present embodiment example, a phase shift amount of a certain segment (the digital phase shift circuit 10-10 to 10-12, 10-21 to 10-23, and the like) is averaged. Also, because the large projection or recess portion (the portion where the phase shift amount is reduced) can be mitigated by applying the mitigation circuit RC of the sixth embodiment to be described below, the phase shift amount of the certain segment can be averaged and therefore the number of mitigation circuits RC to be applied can be reduced.

As described above, in the digital phase shifter 100B of the third embodiment, the capacitor 50 is connected in parallel to each of a region between the first digital phase shift circuit (for example, the digital phase shift circuit 10-10) connected to the connection portion 20 (for example, the connection portion 20-1) and the fourth digital phase shift circuit (for example, the digital phase shift circuit 10-9) adjacent to the first digital phase shift circuit which are the digital phase shift circuits 10 included in the first digital phase shift circuit group (for example, the digital phase shift circuit group 30-1) and a region between the second digital phase shift circuit (for example, the digital phase shift circuit 10-12) connected to the connection portion 20 (for example, the connection portion 20-1) and the fifth digital phase shift circuit (for example, the digital phase shift circuit 10-13) adjacent to the second digital phase shift circuit which are the digital phase shift circuits 10 included in the second digital phase shift circuit group (for example, the digital phase shift circuit group 30-2). Thus, it is possible to average a distribution of phase shift amounts by introducing an element of an imaginary part (the capacitor 50 that is the reactance element) to a portion (between the cells of the first and second digital phase shift circuits 10 when viewed from the connection portion 20) assumed to be a cause of generation of weak reflections in the connection portion 20.

Fourth Embodiment

Next, a fourth embodiment of the present invention is described. In the following description, components identical or equivalent to those of the above-described embodiment are denoted by the same reference signs, and the description thereof is simplified or omitted.

<Digital Phase Shifter>

Figure 14:
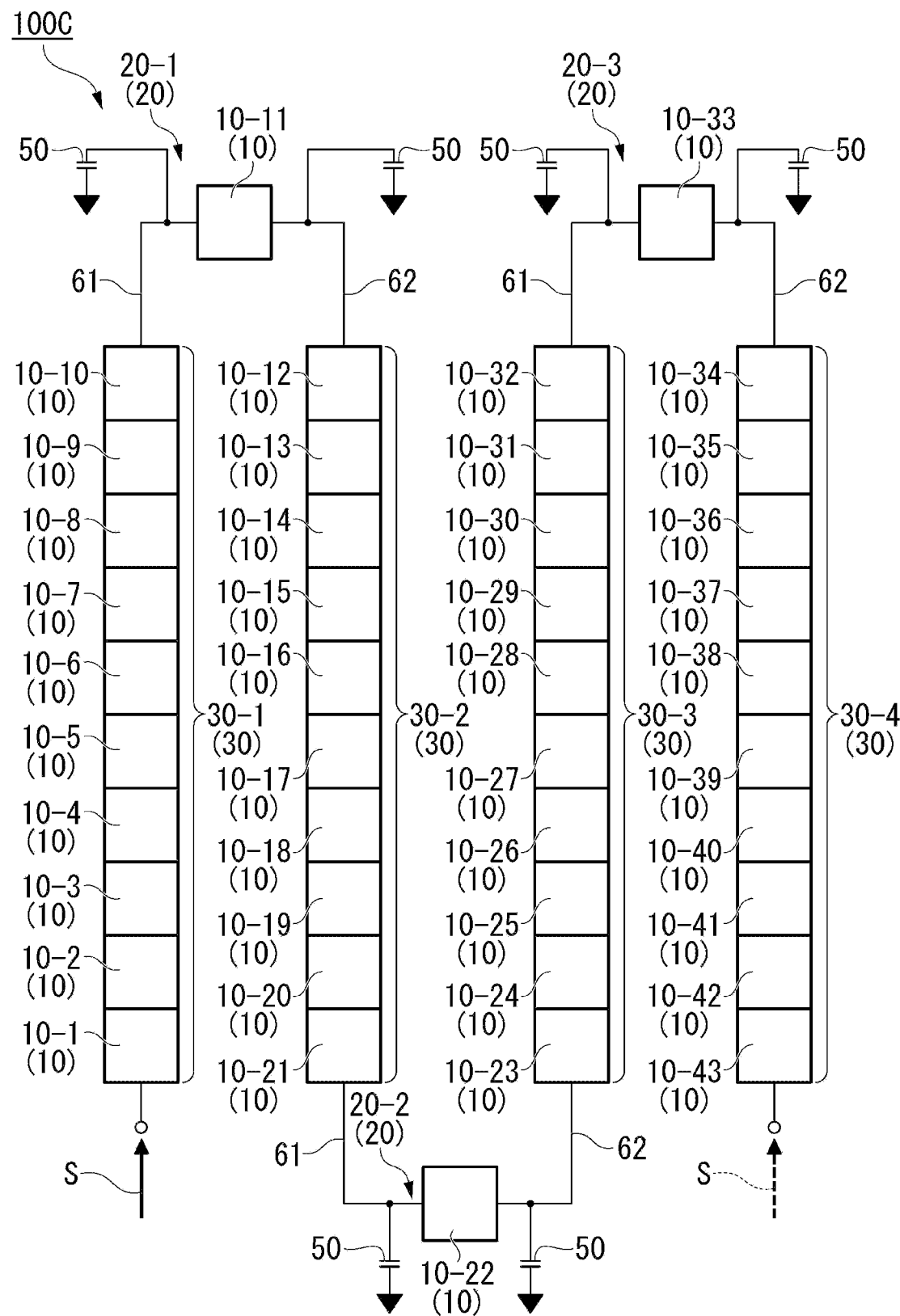
FIG. 14 is a circuit diagram showing a digital phase shifter according to a fourth embodiment.

FIG. 14 is a circuit diagram showing a digital phase shifter 100C according to the fourth embodiment. As shown in FIG. 14, the digital phase shifter 100C in the fourth embodiment is different from that in the above-described embodiments in that capacitors 50 are connected in parallel to both sides of a digital phase shift circuit 10 (a relay digital phase shift circuit) included in a connection portion 20.

Specifically, in a connection portion 20-1, the capacitor 50 is connected in parallel to one end on a first connection portion 61 side of a signal line 1 of a digital phase shift circuit 10-11. One end of the digital phase shift circuit 10-11 is preferably a connection position (contact point) between the signal line 1 of the digital phase shift circuit 10-11 and a first connection line 21 of the first connection portion 61, but may be in the vicinity of the connection position.

Also, in the connection portion 20-1, the capacitor 50 is connected in parallel to the other end on a second connection portion 62 side of the signal line 1 of the digital phase shift circuit 10-11. The other end of the digital phase shift circuit 10-11 is preferably a connection position (contact point) between the signal line 1 of the digital phase shift circuit 10-11 and the first connection line 21 of the second connection portion 62, but may be in the vicinity of the connection position.

Likewise, in the connection portion 20-2, the capacitor 50 is connected in parallel to one end on a first connection portion 61 side of a signal line 1 of a digital phase shift circuit 10-22. Also, in the connection portion 20-2, the capacitor 50 is connected in parallel to the other end on the second connection portion 62 side of the signal line 1 of the digital phase shift circuit 10-22. Also, likewise, in the connection portion 20-3, the capacitor 50 is connected in parallel to one end on a first connection portion 61 side of a signal line 1 of a digital phase shift circuit 10-33. Also, in the connection portion 20-3, the capacitor 50 is connected in parallel to the other end on the second connection portion 62 side of the signal line 1 of the digital phase shift circuit 10-33.

<Characteristics of Digital Phase Shifter>

Figure 15A:
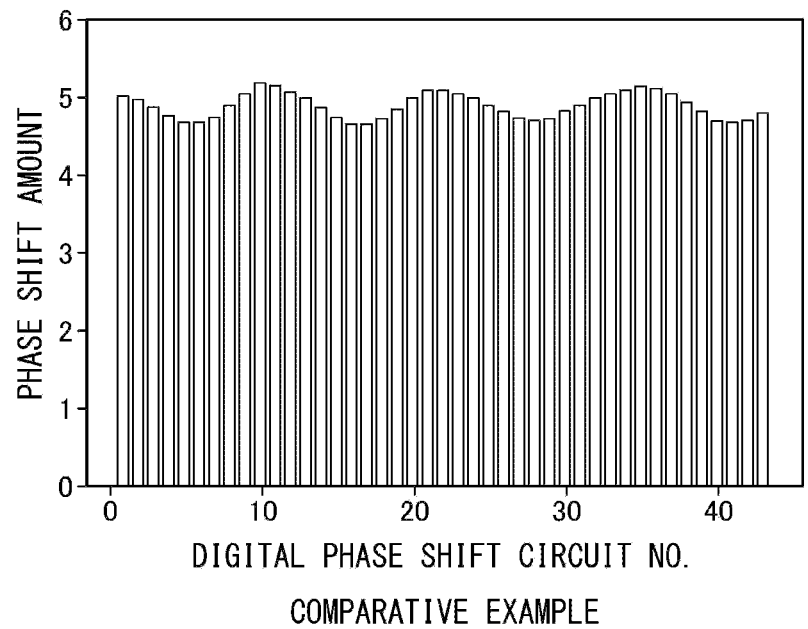
FIG. 15A is a diagram showing a distribution of phase shift amounts of a comparative example in which a capacitor is removed in a modified example of the digital phase shifter according to the fourth embodiment.
Figure 15B:
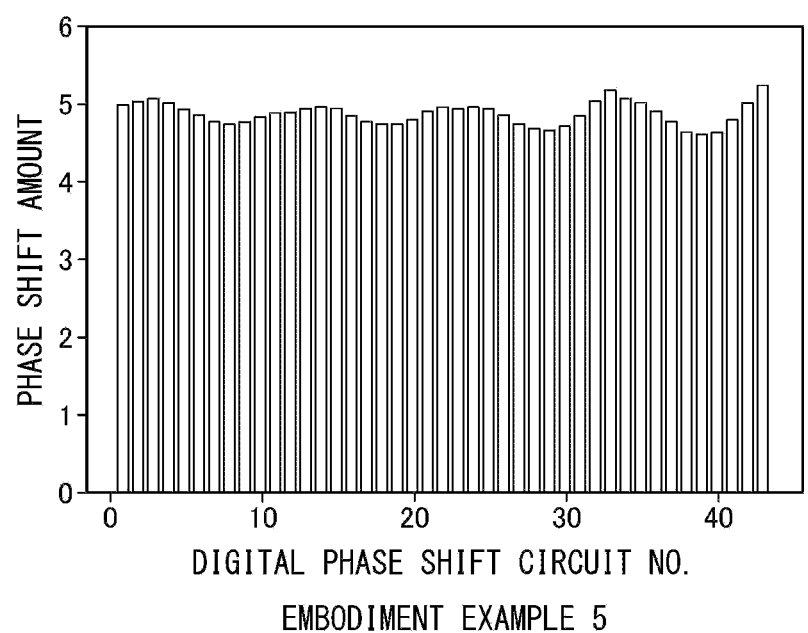
FIG. 15B is a diagram showing a distribution of phase shift amounts of Embodiment Example 5 in a modified example of the digital phase shifter according to the fourth embodiment.

FIG. 15A is a diagram showing a distribution of phase shift amounts of the comparative example in which the capacitor 50 is removed in a modified example of the digital phase shifter 100C according to the fourth embodiment. FIG. 15B is a diagram showing a distribution of phase shift amounts of Embodiment Example 5 in a modified example of the digital phase shifter 100C according to the fourth embodiment. Other conditions are similar to those of FIGS. 8A and 8B.

First, referring to FIG. 15A, in the digital phase shift circuits 10 (the digital phase shift circuits 10-10 to 10-12, 10-21 to 10-23, 10-32 to 10-34, and the like) in the vicinity of the connection portion 20, it can be seen that a projection portion occurs in a distribution of phase shift amounts.

Next, referring to FIG. 15B, it can be seen that in the digital phase shift circuits 10 (the digital phase shift circuits 10-10 to 10-12, 10-21 to 10-23, 10-32 to 10-34, and the like) in the vicinity of the connection portion 20, the projection portion of the distribution of phase shift amounts is small and the distribution of phase shift amounts is averaged (a recess and projection difference is small) as compared with FIG. 15A. For this reason, it can be seen that it is desirable to connect the capacitor 50 in parallel between the cells of the first and second digital phase shift circuits 10 adjacent to the connection portion 20. Although the projection portion of the distribution of the phase shift amount is locally large in the digital phase shift circuit 10-43 or the like in the present embodiment example, a phase shift amount of a certain segment (the digital phase shift circuit 10-10 to 10-12, 10-21 to 10-23, and the like) is averaged. Also, because the large projection or recess portion can be mitigated by applying the mitigation circuit RC of the sixth embodiment to be described below, the phase shift amount of the certain segment can be averaged and the number of mitigation circuits RC to be applied can be reduced.

As described above, in the digital phase shifter 100C of the fourth embodiment, a capacitor is connected in parallel to each of the first connection portion 61 side and the second connection portion 62 side in the signal line 1 of the third digital phase shift circuit (for example, the digital phase shift circuit 10-11). Thus, it is possible to average a distribution of phase shift amounts by introducing an element of an imaginary part (the capacitor 50 that is a reactance element) to a portion (both sides of the digital phase shift circuit 10 (the relay digital phase shift circuit) included in the connection portion 20) assumed to cause of generation of weak reflections in the connection portion 20.

Fifth Embodiment

Next, a fifth embodiment of the present invention is described. In the following description, components identical or equivalent to those of the above-described embodiment are denoted by the same reference signs, and the description thereof is simplified or omitted.

Figure 16:
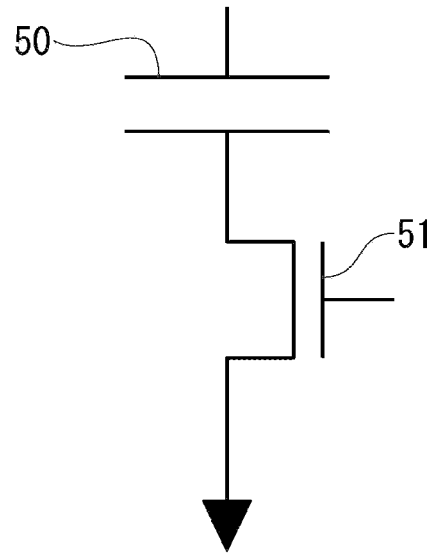
FIG. 16 is a circuit diagram around a capacitor according to a fifth embodiment.

FIG. 16 is a circuit diagram around a capacitor 50 according to the fifth embodiment. In the fifth embodiment, as shown in FIG. 16, an electronic switch 51 is provided on a lower electrode side of the capacitor 50 for averaging a distribution of phase shift amounts. Also, the electronic switch 51 may be provided on an upper electrode side of the capacitor 50. The electronic switch 51 shown in FIG. 16 is connected in series with the capacitor 50 between the lower electrode of the capacitor 50 and the ground. The electronic switch 51 is, for example, a MOS-type FET. In the example shown in FIG. 16, the electronic switch 51 has a drain terminal connected to the lower electrode of the capacitor 50, a source terminal connected to the ground, and a gate terminal connected to the switch control portion 8 (see FIG. 1).

The electronic switch 51 is controlled to be in a closed state or an open state on the basis of a gate signal input from the switch control portion 8 to the gate terminal. The electronic switch 51 makes the lower electrode of the capacitor 50 and the ground in an electrically connected state in which the lower electrode of the capacitor 50 is electrically connected to the ground or an electrically disconnected state in which the electrical connection is disconnected under a control of the switch control portion 8. Also, the electronic switch 51 may be a bipolar transistor (BJT) or the like.

Thus, in the fifth embodiment, an electronic switch 51 configured to switch between whether or not to ground one end side (lower electrode side) of the capacitor 50 is provided. The electronic switch 51 is turned ON (closed state) when the desired frequency band of the signal S is a first frequency band and turned OFF (open state) when the desired frequency band is a second frequency band, thereby enabling the effect of the capacitor 50 to be appropriately exhibited in accordance with each desired frequency band.

Sixth Embodiment

Next, a sixth embodiment of the present invention is described. In the following description, components identical or equivalent to those of the above-described embodiment are denoted by the same reference signs, and the description thereof is simplified or omitted.

In the sixth embodiment, in order to further mitigate a projection portion or a recess portion of a distribution of phase shift amounts, at least one of the above-described digital phase shift circuits 10-1 to 10-43 becomes a mitigation circuit RC for mitigating a distribution of phase shift amounts generated due to weak reflections occurring in a front side and a rear side of the connection portion 20.

As described below, the mitigation circuit RC includes a first mitigation circuit RC1 and a second mitigation circuit RC2. The first mitigation circuit RC1 is a circuit for mitigating a recess portion of the above-described distribution of phase shift amounts as a digital phase shift circuit 10 having a large phase shift amount as compared with the digital phase shift circuit 10 other than the mitigation circuit RC (the first mitigation circuit RC1 and the second mitigation circuit RC2). The second mitigation circuit RC2 is a circuit for mitigating a projection portion of the above-described distribution of phase shift amounts as a digital phase shift circuit 10 having a small phase shift amount as compared with the digital phase shift circuit 10 other than the mitigation circuit RC (the first mitigation circuit RC1 and the second mitigation circuit RC2).

For example, in the case of FIG. 8B, the digital phase shift circuit 10-43 may be the second mitigation circuit RC2. Also, the digital phase shift circuit 10-39 or 10-40 may be the first mitigation circuit RC1. A specific configuration of the mitigation circuit RC (the first mitigation circuit RC1 or the second mitigation circuit RC2) is described below.

<Mitigation Circuit>

«First Mitigation Circuit»

FIGS. 17A, 17B, 17C, and 17D are diagrams for describing the first mitigation circuit RC1 of the mitigation circuits RC according to the sixth embodiment. The basic configuration of the first mitigation circuit RC1 is substantially similar to the digital phase shift circuit 10 (hereinafter referred to as a "standard digital phase shift circuit ST") other than the mitigation circuit RC (the first mitigation circuit RC1 and the second mitigation circuit RC2). However, the configuration of the first mitigation circuit RC1 is slightly different from that of the standard digital phase shift circuit ST such that the first mitigation circuit RC1 has a larger phase shift amount than the standard digital phase shift circuit ST.

Specifically, the first mitigation circuit RC1 has a configuration that satisfies at least one of the conditions listed below.

Condition 1: The length of the first mitigation circuit RC1 is longer than the length of the standard digital phase shift circuit ST.

Condition 2: The distance between the signal line 1 and the inner line 2 in the first mitigation circuit RC1 is shorter than that in the standard digital phase shift circuit ST.

Condition 3: The distance between the signal line 1 and the outer line 3 in the first mitigation circuit RC1 is longer than that in the standard digital phase shift circuit ST.

Condition 4: The capacitor 5 of the first mitigation circuit RC1 is larger than that of the standard digital phase shift circuit ST.

Condition 5: The electronic switches 7a and 7b of the first mitigation circuit RC1 are larger than those of the standard digital phase shift circuit ST.

Figure 17A:
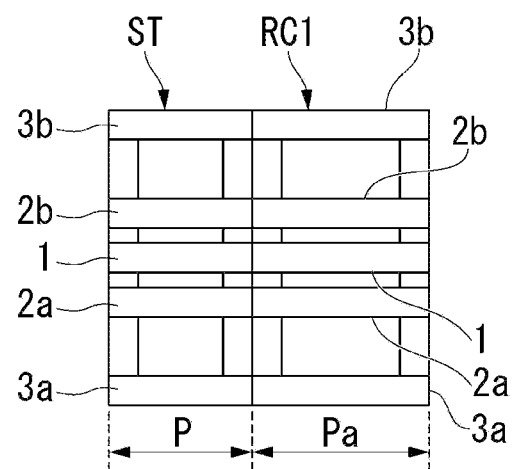
FIG. 17A is a diagram for describing a first mitigation circuit of mitigation circuits according to a sixth embodiment.

FIG. 17A is a diagram showing the first mitigation circuit RC1 satisfying the above "condition 1." A length Pa of the first mitigation circuit RC1 shown in FIG. 17A (the length of the signal line 1, the inner line 2, the outer line 3, or the like) is longer than a length P of the standard digital phase shift circuit ST.

Figure 17B:
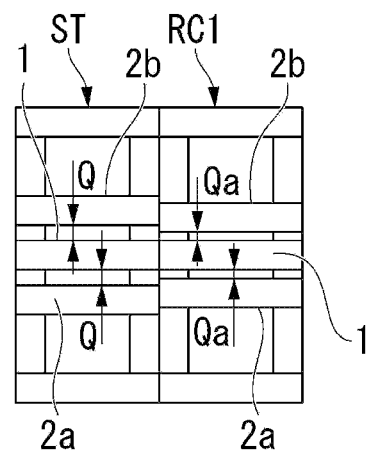
FIG. 17B is a diagram for describing the first mitigation circuit of the mitigation circuits according to the sixth embodiment.

FIG. 17B is a diagram showing the first mitigation circuit RC1 satisfying the above-described "condition 2." A distance Qa between the signal line 1 and the inner line 2 (the first inner line 2a and the second inner line 2b) in the first mitigation circuit RC1 shown in FIG. 17B is shorter than a distance Q between the signal line 1 and the inner line 2 (the first inner line 2a and the second inner line 2b) in the standard digital phase shift circuit ST.

Figure 17C:
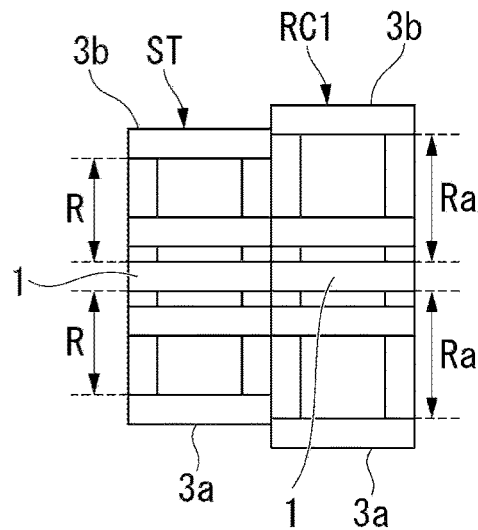
FIG. 17C is a diagram for describing the first mitigation circuit of the mitigation circuits according to the sixth embodiment.

FIG. 17C is a diagram showing the first mitigation circuit RC1 satisfying the above-described "condition 3." A distance Ra between the signal line 1 and the outer line 3 (the first outer line 3a and the second outer line 3b) in the first mitigation circuit RC1 shown in FIG. 17C is longer than a distance R between the signal line 1 and the outer line 3 (the first outer line 3a and the second outer line 3b) in the standard digital phase shift circuit ST.

Figure 17D:
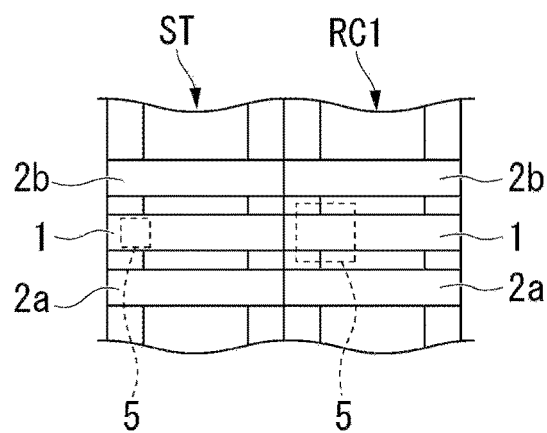
FIG. 17D is a diagram describing the first mitigation circuit of the mitigation circuits according to the sixth embodiment.

FIG. 17D is a diagram showing the first mitigation circuit RC1 satisfying the above-described "condition 4." A size of the capacitor 5 in the first mitigation circuit RC1 shown in FIG. 17D is larger than that of the capacitor 5 in the standard digital phase shift circuit ST. Although not shown, sizes of the electronic switch 7a and the electronic switch 7b (see FIGS. 2 to 4) of the first mitigation circuit RC1 satisfying the above-described "condition 5" are larger than those of the electronic switch 7a and the electronic switch 7b of the standard digital phase shift circuit ST.

As described above, the first mitigation circuit RC1 has a larger phase shift amount than the standard digital phase shift circuit ST. Thus, it is possible to increase the phase shift amount using the first mitigation circuit RC1 instead of the standard digital phase shift circuit ST. Therefore, for example, when a distribution of phase shift amounts generated due to weak reflections occurring in a front side and a rear side of the connection portion 20 has a recess portion, the first mitigation circuit RC1 can be used to mitigate the recess portion.

«Second Mitigation Circuit»

FIGS. 18A, 18B, 18C, and 18D are diagrams for describing the second mitigation circuit RC2 of the mitigation circuits RC according to the sixth embodiment. A basic configuration of the second mitigation circuit RC2 is substantially similar to that of the standard digital phase shift circuit ST like the first mitigation circuit RC1. However, a configuration of the second mitigation circuit RC2 is slightly different from that of the standard digital phase shift circuit ST such that the second mitigation circuit RC2 has a smaller phase shift amount than the standard digital phase shift circuit ST.

Specifically, the second mitigation circuit RC2 has a configuration that satisfies at least one of the conditions listed below.

Condition 1: The length of the second mitigation circuit RC2 is shorter than the length of the standard digital phase shift circuit ST.

Condition 2: The distance between the signal line 1 and the inner line 2 in the second mitigation circuit RC2 is longer than that in the standard digital phase shift circuit ST.

Condition 3: The distance between the signal line 1 and the outer line 3 in the second mitigation circuit RC2 is shorter than that in the standard digital phase shift circuit ST.

Condition 4: The capacitor 5 of the second mitigation circuit RC2 is smaller than that of the standard digital phase shift circuit ST.

Condition 5: The electronic switches 7a and 7b of the second mitigation circuit RC2 are smaller than those of the standard digital phase shift circuit ST.

Figure 18A:
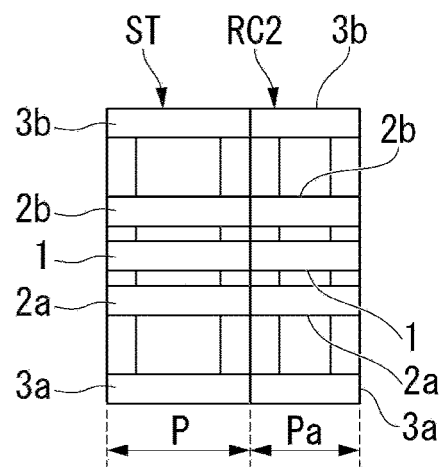
FIG. 18A is a diagram describing a second mitigation circuit of the mitigation circuits according to the sixth embodiment.

FIG. 18A is a diagram showing the second mitigation circuit RC2 satisfying the above "condition 1." A length Pa of the second mitigation circuit RC2 shown in FIG. 18A (the length of the signal line 1, the inner line 2, the outer line 3, or the like) is shorter than a length P of the standard digital phase shift circuit ST.

Figure 18B:
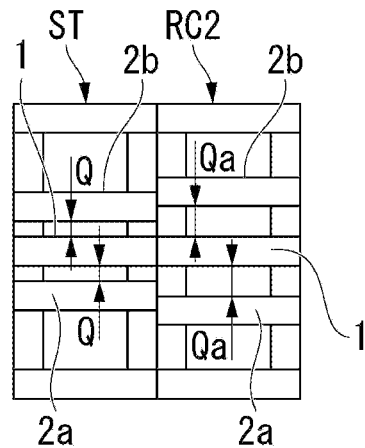
FIG. 18B is a diagram describing the second mitigation circuit of the mitigation circuits according to the sixth embodiment.

FIG. 18B is a diagram showing the second mitigation circuit RC2 satisfying the above-described "condition 2." A distance Qa between the signal line 1 and the inner line 2 (the first inner line 2a and the second inner line 2b) in the second mitigation circuit RC2 shown in FIG. 18B is longer than a distance Q between the signal line 1 and the inner line 2 (the first inner line 2a and the second inner line 2b) in the standard digital phase shift circuit ST.

Figure 18C:
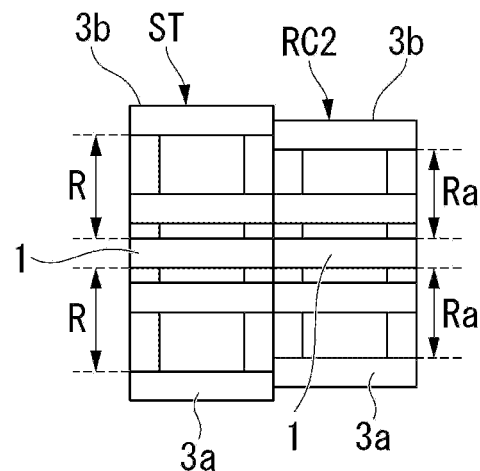
FIG. 18C is a diagram describing the second mitigation circuit of the mitigation circuits according to the sixth embodiment.

FIG. 18C is a diagram showing the second mitigation circuit RC2 satisfying the above-described "condition 3." A distance Ra between the signal line 1 and the outer line 3 (the first outer line 3a and the second outer line 3b) in the second mitigation circuit RC2 shown in FIG. 18C is shorter than a distance R between the signal line 1 and the outer line 3 (the first outer line 3a and the second outer line 3b) in the standard digital phase shift circuit ST.

Figure 18D:
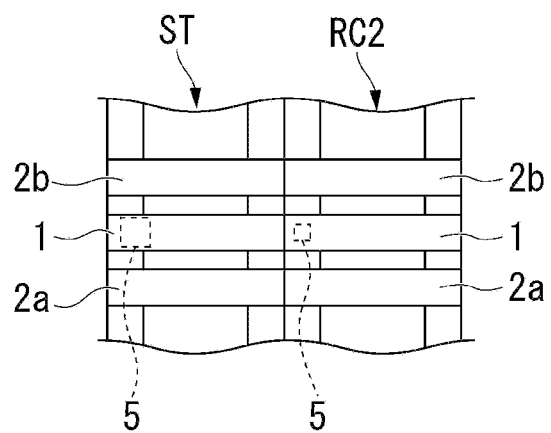
FIG. 18D is a diagram describing the second mitigation circuit of the mitigation circuits according to the sixth embodiment.

FIG. 18D is a diagram showing the second mitigation circuit RC2 satisfying the above-described "condition 4." A size of the capacitor 5 in the second mitigation circuit RC2 shown in FIG. 18D is smaller than that of the capacitor 5 in the standard digital phase shift circuit ST. Although not shown, sizes of the electronic switch 7a and the electronic switch 7b (see FIGS. 2 to 4) of the second mitigation circuit RC2 satisfying the above-described "condition 5" are smaller than those of the electronic switch 7a and the electronic switch 7b of the standard digital phase shift circuit ST.

As described above, the second mitigation circuit RC2 has a smaller phase shift amount than the standard digital phase shift circuit ST. Thus, it is possible to decrease the phase shift amount using the second mitigation circuit RC2 instead of the standard digital phase shift circuit ST. Therefore, for example, when a distribution of phase shift amounts generated due to weak reflections occurring in a front side and a rear side of the connection portion 20 has a projection portion, the second mitigation circuit RC2 can be used to mitigate the projection portion.

As described above, in the sixth embodiment, there are provided a plurality of digital phase shift circuit groups 30 in which a plurality of digital phase shift circuits 10 are connected in cascade and one or more bend-type connection portions 20 connected between two digital phase shift circuit groups 30, wherein at least one of the digital phase shift circuits 10 constituting at least one digital phase shift circuit group 30 is a mitigation circuit RC that mitigates a distribution of phase shift amounts. Thus, the distribution of phase shift amounts generated due to weak reflections occurring in a front side and a rear side of the connection portion 20 can be further mitigated.

Here, the mitigation circuit RC includes at least one of the first mitigation circuit RC1, which is a digital phase shift circuit 10 having a larger phase shift amount than the standard digital phase shift circuit ST, and the second mitigation circuit RC2, which is a digital phase shift circuit 10 having a smaller phase shift amount than the standard digital phase shift circuit ST. It is possible to mitigate a recess portion in the distribution of phase shift amounts using the first mitigation circuit RC1 and it is possible to mitigate a projection portion in the distribution of phase shift amounts using the second mitigation circuit RC2. Thus, using the first mitigation circuit RC1 and the second mitigation circuit RC2, it is possible to take a countermeasure regardless of whether the distribution of phase shift amounts has a recess portion or a projection portion.

Although an embodiment of the present invention is described above, the present invention is not limited to the above embodiment and modifications can be freely made within the scope of the present invention. Although a case where the frequency of the signal S is, for example, 30 [GHz], is described in the above-described embodiment, the frequency of the signal S may be a frequency other than 30 [GHz]. For example, the frequency of the signal S may be any frequency in the frequency band of microwaves, quasi-millimeter waves, millimeter waves, or the like.

Although a configuration in which the digital phase shift circuit 10 includes the capacitor 5 (the second capacitor) is described in the above-described embodiment, a configuration in which the capacitor 5 is absent may be used. In this case, the electronic switch 7d (the second electronic switch) connected to the lower electrode of the capacitor 5 may also be absent.

REFERENCE SIGNS LIST

1 Signal line
2 Inner line
2a First inner line
2b Second inner line
3 Outer line
3a First outer line
3b Second outer line
4 Grounding conductor
4a First grounding conductor
4b Second grounding conductor
5 Capacitor (second capacitor)
6 Connection conductor
6a to 6g Connection conductor
7 Electronic switch
7a to 7d Electronic switch
8 Switch control portion
10 Digital phase shift circuit
10-1 to 10-43 Digital phase shift circuit
20 Connection portion
20-1 to 20-3 Connection portion
21 First connection line
22 Second connection line
22a Second connection line
22b Second connection line
23 Third connection line
23a Third connection line
23b Third connection line
24 First ground layer
25 Second ground layer
30 Digital phase shift circuit group
30-1 to 30-4 Digital phase shift circuit group
40 to 43 Via-hole
50 Capacitor (first capacitor)
51 Electronic switch (first electronic switch)
61 First connection portion
62 Second connection portion
100 Digital phase shifter
100A to 100D) Digital phase shifter
220) Side surface
R1 Return current
R2 Return current
Ra Distance
RC Mitigation circuit
RC1 First mitigation circuit
RC2 Second mitigation circuit
S Signal

The invention claimed is:

1. A digital phase shifter comprising:
at least one first digital phase shift circuit group in which a plurality of digital phase shift circuits are connected in cascade;
at least one second digital phase shift circuit group in which a plurality of digital phase shift circuits are connected in cascade; and
at least one bend-type connection portion configured to connect a first digital phase shift circuit located at an end of the first digital phase shift circuit group and a second digital phase shift circuit located at an end of the second digital phase shift circuit group,
wherein each of the plurality of digital phase shift circuits included in the at least one first digital phase shift circuit group and the plurality of digital phase shift circuits included in the at least one second digital phase shift circuit group includes at least a signal line, a pair of inner lines provided on both sides of the signal line, a pair of outer lines provided outside of the pair of inner lines, a first grounding conductor connected to one ends of the pair of inner lines and the pair of outer lines, a second grounding conductor connected to the other ends of the pair of outer lines, and a pair of electronic switches, one of the pair of electronic switches being provided between the other end of one of the pair of inner lines and the second grounding conductor and the other of the pair of electronic switches being provided between the other end of the other of the pair of inner lines and the second grounding conductor,
wherein each of the plurality of digital phase shift circuits included in the at least one first digital phase shift circuit group and the plurality of digital phase shift circuits included in the at least one second digital phase shift circuit group is a circuit which is set in a low-delay mode in which a return current flows through the pair of inner lines or a high-delay mode in which a return current flows through the pair of outer lines,
wherein the connection portion includes
a first connection portion connected to the first digital phase shift circuit;
a second connection portion connected to the second digital phase shift circuit; and
a third digital phase shift circuit that is a digital phase shift circuit interposed between the first connection portion and the second connection portion, and having a configuration same as that of each of the plurality of digital phase shift circuits included in the at least one first digital phase shift circuit group and the plurality of digital phase shift circuits included in the at least one second digital phase shift circuit group, wherein the first connection portion includes a first connection line for connecting the signal line of the first digital phase shift circuit and the signal line of the third digital phase shift circuit and the second connection portion includes another first connection line for connecting the signal line of the second digital phase shift circuit and the signal line of the third digital phase shift circuit, and wherein a capacitor is connected in parallel to at least one of the first connection line of the first connection portion, the first connection line of the second connection portion, a region in a vicinity of a connection position between the signal lines of two adjacent digital phase shift circuits constituting the first digital phase shift circuit group, and a region in a vicinity of a connection position between the signal lines of two adjacent digital phase shift circuits constituting the second digital phase shift circuit group.

2. The digital phase shifter according to claim 1, wherein the capacitor is connected in parallel to each of the first connection line of the first connection portion on a side of the first digital phase shift circuit and the first connection line of the second connection portion on a side of the second digital phase shift circuit.

3. The digital phase shifter according to claim 1, wherein the capacitor is connected in parallel to each of the signal line of the third digital phase shift circuit on a side of the first connection portion and the signal line of the third digital phase shift circuit on a side of the second connection portion.

4. The digital phase shifter according to claim 1, wherein the capacitor is connected in parallel to one of a region in a vicinity of a connection position between the signal line of the first digital phase shift circuit and the signal line of a fourth digital phase shift circuit adjacent to the first digital phase shift circuit and a region in a vicinity of a connection position between the signal line of the second digital phase shift circuit and the signal line of a fifth digital phase shift circuit adjacent to the second digital phase shift circuit.

5. The digital phase shifter according to claim 4,
wherein the capacitor connected in parallel to the one of the region in the vicinity of the connection position between the signal line of the first digital phase shift circuit and the signal line of the fourth digital phase shift circuit and the region in the vicinity of the connection position between the signal line of the second digital phase shift circuit and the signal line of the fifth digital phase shift circuit is connected in parallel to a transmission line provided in the one region in the vicinity of the connection position, and wherein the transmission line connects the signal line of the first digital phase shift circuit and the signal line of the fourth digital phase shift circuit or connects the signal line of the second digital phase shift circuit and the signal line of the fifth digital phase shift circuit.

6. The digital phase shifter according to claim 1, wherein the capacitor is connected in parallel to each of a region in a vicinity of a connection position between the signal line of the first digital phase shift circuit and the signal line of the fourth digital phase shift circuit adjacent to the first digital phase shift circuit and a region in a vicinity of a connection position between the signal line of the second digital phase shift circuit and the signal line of the fifth digital phase shift circuit adjacent to the second digital phase shift circuit.

7. The digital phase shifter according to claim 6,
wherein one of the capacitor connected in parallel in the vicinity of the connection position between the signal line of the first digital phase shift circuit and the signal line of the fourth digital phase shift circuit and the capacitor connected in parallel in the vicinity of the connection position between the signal line of the second digital phase shift circuit and the signal line of the fifth digital phase shift circuit is connected in parallel to a transmission line provided in the vicinity of the connection position to which the one capacitor is connected in parallel, and wherein the transmission line connects the signal line of the first digital phase shift circuit and the signal line of the fourth digital phase shift circuit or connects the signal line of the second digital phase shift circuit and the signal line of the fifth digital phase shift circuit.

8. The digital phase shifter according to claim 6,
wherein the capacitor connected in parallel in the vicinity of the connection position between the signal line of the first digital phase shift circuit and the signal line of the fourth digital phase shift circuit is connected in parallel to a first transmission line provided in the vicinity of the connection position between the signal line of the first digital phase shift circuit and the signal line of the fourth digital phase shift circuit, wherein the first transmission line connects the signal line of the first digital phase shift circuit and the signal line of the fourth digital phase shift circuit, wherein the capacitor connected in parallel in the vicinity of the connection position between the signal line of the second digital phase shift circuit and the signal line of the fifth digital phase shift circuit is connected in parallel to a second transmission line provided in the vicinity of the connection position between the signal line of the second digital phase shift circuit and the signal line of the fifth digital phase shift circuit, and wherein the second transmission line connects the signal line of the second digital phase shift circuit and the signal line of the fifth digital phase shift circuit.

9. The digital phase shifter according to claim 1, comprising an electronic switch configured to switch between whether or not to ground a side of one end of the capacitor.

10. The digital phase shifter according to claim 1, wherein at least one of the plurality of digital phase shift circuits is a mitigation circuit configured to mitigate a distribution of phase shift amounts.

11. The digital phase shifter according to claim 1, wherein each of the plurality of digital phase shift circuits included in the at least one first digital phase shift circuit group, the plurality of digital phase shift circuits included in the at least one second digital phase shift circuit group, and the third digital phase shift circuit includes
a second capacitor connected between the signal line and at least one of the first grounding conductor and the second grounding conductor; and
a second electronic switch configured to switch between whether or not to connect the second capacitor between the signal line and the at least one of the first grounding conductor and the second grounding conductor.

12. The digital phase shifter according to claim 1,
wherein the first connection portion includes a pair of second connection lines configured to connect the pair of inner lines of the first digital phase shift circuit and the pair of inner lines of the third digital phase shift circuit and the second connection portion includes a pair of second connection lines configured to connect the pair of inner lines of the second digital phase shift circuit and the pair of inner lines of the third digital phase shift circuit, and wherein the first connection portion includes
- a ground layer arranged at least one of above and below the first connection line and the pair of second connection lines; and
- a via-hole configured to connect at least the pair of second connection lines and the ground layer.

13. The digital phase shifter according to claim 12, wherein the first connection portion includes a pair of third connection lines configured to connect the pair of outer lines of the first digital phase shift circuit and the pair of outer lines of the third digital phase shift circuit and the second connection portion includes a pair of third connection lines configured to connect the pair of outer lines of the second digital phase shift circuit and the pair of outer lines of the third digital phase shift circuit.

* * * * *